United States Patent [19]

Clarke, Jr. et al.

[11] Patent Number: 6,021,419
[45] Date of Patent: Feb. 1, 2000

[54] SYSTEM FOR FILTERING BROADCAST DIGITAL INFORMATION IN ACCORDANCE WITH CHANNEL IDENTIFIERS STORED IN PREFERENCE LIST WHICH CAN BE DYNAMICALLY UPDATED VIA COMMAND THROUGH NETWORK

[75] Inventors: Edward Payson Clarke, Jr., Ossining; Robert Alan Flavin, Yorktown Heights; Perwaiz Nihal, Fishkill, all of N.Y.; Geoffrey Hale Purdy, Roxbury, Conn.; Norbert George Vogl, Mahopac, N.Y.

[73] Assignee: International Business Machines Corporation, Armonk, N.Y.

[21] Appl. No.: 08/931,801
[22] Filed: Sep. 16, 1997
[51] Int. Cl.⁷ ...................................................... G06F 13/00
[52] U.S. Cl. ............................................ 708/300; 708/314
[58] Field of Search ............................. 380/25; 707/104; 370/422, 312; 708/300, 314

[56] References Cited

U.S. PATENT DOCUMENTS

| | | | |
|---|---|---|---|
| 5,377,354 | 12/1994 | Scannell et al. | 395/673 |
| 5,541,911 | 7/1996 | Nilakantan et al. | 370/422 |
| 5,570,366 | 10/1996 | Baker et al. | 370/312 |
| 5,608,662 | 3/1997 | Large et al. | 364/724.011 |
| 5,680,461 | 10/1997 | McManis | 380/25 |
| 5,706,507 | 1/1998 | Schloss | 707/104 |

OTHER PUBLICATIONS

"Optimizing Bandwidth On Your Network," http://www-.pointcast.com/support/pen/faq/optinet.html, PointCast Inc. 1996.

"Information Provider's Guide," Hughes Network System, Inc., Germantown, MD 20876, 1995.

"Real Time Streaming Protocol (RTSP)," H. Schulzrinne, A. Rao, R. Lanphier, Columbia U./Netscape/Progressive Network, July 30, 1997.

"Realmedia Overview," Progressive Networks, 1997.

"Hypertext Transfer Protocol—http/1.1,", R. Fielding et al, Network Working Group, Standards Track, Jan. 1997.

Broadcaster's Guide To MPEG, http://www.re.dk/Library/reintro.html, Sep. 1996.

*Primary Examiner*—Le Hien Luu
*Attorney, Agent, or Firm*—Whitham, Curtis & Whitham; Louis J. Percello

[57] ABSTRACT

A filter adaptor connects a computer to a network through a network connection. The network has a large plurality of broadcast type messages having a given protocol. Each of the broadcast messages has a destination field and a source field. The adaptor has a preference list of one or more fixed channels that the computer is capable of receiving. Each fixed channel has a channel identifier that is also listed in the preference list. Further, the filter adapter has a filtering process that monitors the source field and discards any message that does not have a source identifier in the source field that matches one of the channel identifiers on the preference list.

18 Claims, 22 Drawing Sheets

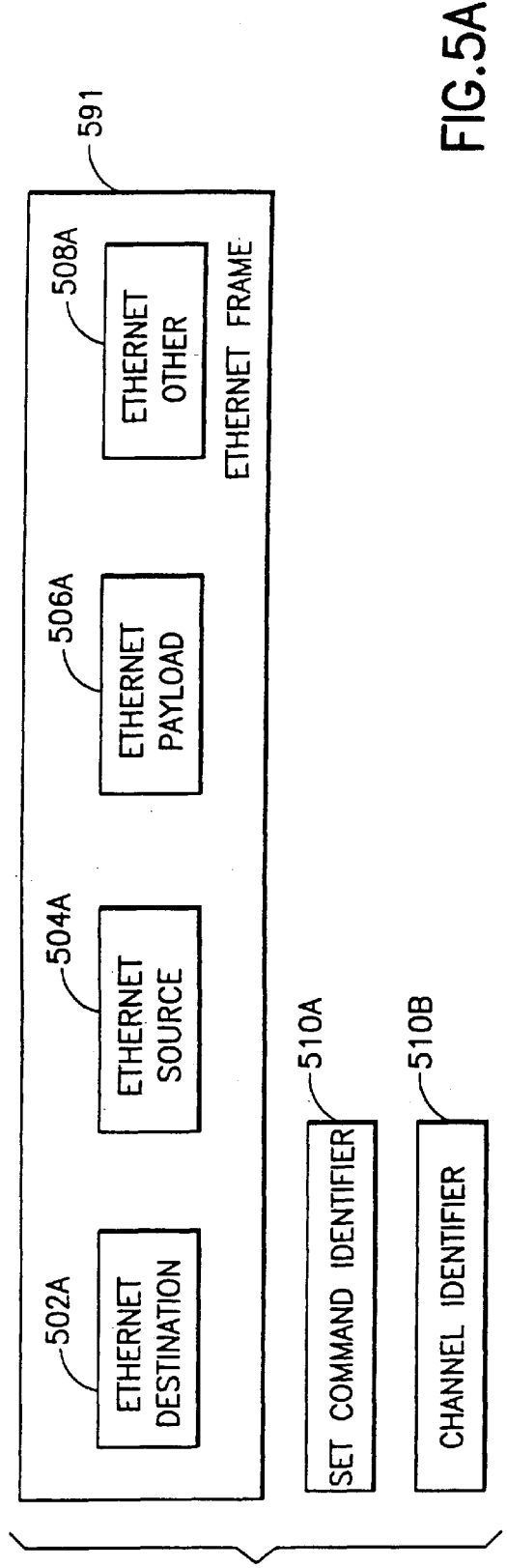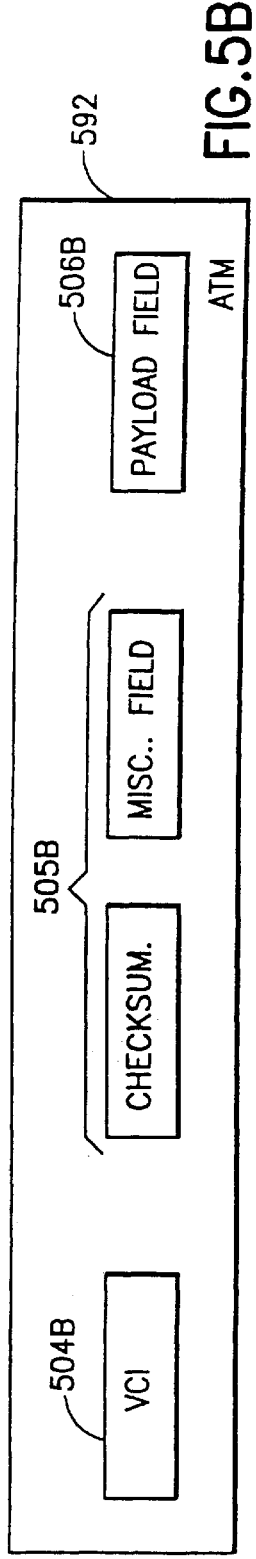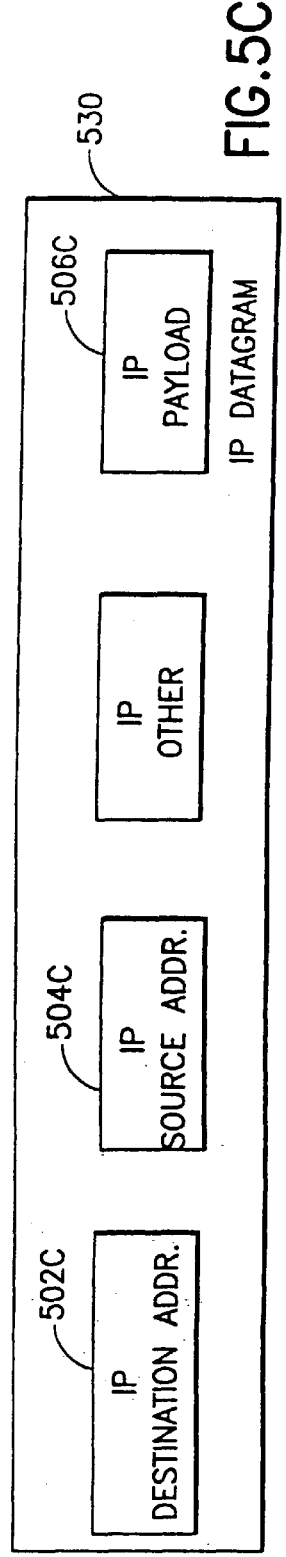

SYSTEM FOR FILTERING BROADCAST DIGITAL INFORMATION IN ACCORDANCE WITH CHANNEL IDENTIFIERS STORED IN PREFERENCE LIST WHICH CAN BE DYNAMICALLY UPDATED VIA COMMAND THROUGH NETWORK

FIELD OF THE INVENTION

This invention relates to the field of filtering and selecting broadcast information. More specifically, the invention relates to using network protocols to filter information from a broadcasted digital signal.

BACKGROUND OF THE INVENTION

Network computing is well known. For example, see U.S. Pat. No. 5,371,852 to Attanasio et al. issued on Dec. 6, 1994 and U.S. patent application Ser. No. 08/715,214 filed Sep. 12, 1996 entitled "System and Method for Dynamic Video Routing" to Flavin et al. and U.S. patent application Ser. No. 08/717,339 filed Sep. 20, 1996 entitled "System and Method for Measuring and Accounting for Data Traffic on Networks" to Flavin et al. This patent and these Applications are herein incorporated by reference in their entirety.

FIG. 1 is a block diagram of the general hardware and software model of a WAN and a LAN and FIG. 1A shows detail of a typical satellite uplink facility. Block 110 is a plurality of internet service providers (ISPs) which deliver data to and from the Internet to a satellite uplink facility 115. This data can have all varieties of well known content, e.g. movies, communications, video, audio, animation, text, etc. The ISP(s) 110 are connected to the satellite uplink facility 115 by high speed telephone lines (T1) 111. The T1 lines 111 enters the satellite uplink facility 115 and are connected to high speed modems (CSU/DSU) 116. The high speed modems 116 read data from the T1 lines 111 and forward the data into the router 118 through network connections 117. The router 118 examines the information packets 195 on the network connections and forwards the packets 195 to the switch 125 or servers 121, through the network connections 119 and 120, respectively. The switch 125 receives information packets from network connections 119 and/or 124 and serializes the packets onto the single network connection 126. The network connection 126 is connected to a satellite transmitter 127 which modulates the computer data into satellite frequencies and broadcasts the data through a satellite dish 129 which is aimed at a satellite 130. The satellite 130 receives the data sent 129A by the satellite transmitter 127 and broadcasts 131 the data back onto the earth.

Servers 121 receive packets 195 from network connections 120 and perform computer processes 122 which send second sets of network packets 195 to the switch 125 or back to the router 118 over network connections 124 and 120, respectively.

Block 164 is a satellite dish at a home. The satellite dish 164 receives data which has been broadcast from the satellite 130 and sends the data into a satellite receiver 161. The satellite receiver 161 listens to the broadcast frequency and converts the broadcast signal into computer data. The computer data is then sent into the computer 160 and, optionally, stored in a disk drive 162. Block 150 is a cable head-end and/or a network operations center (NOC). It has a computer 151 which is equipped with a satellite receiver 154. The satellite receiver 154 listens to a signal received by the satellite dish 155 and broadcast over the satellite 130. Upon receiving a signal, the satellite receiver 154 converts the signal into digital computer data and sends the data into the computer 151. Optionally, the computer 151 can also be equipped with a telephone modem (or CSU/DSU) 153. This modem 153 can be connected to an internet service provider 140 through a telephone line 141. When the computer 151 has received computer data, it sends the data to a cable transmitter 152. The cable transmitter 152 broadcasts the computer data onto the cable hybrid fiber coax infrastructure 157. Optionally, the computer 151 performs a routing process 158 which filters and serializes the data being received by the satellite receiver 154 and the modem 153.

The hybrid fiber coax infrastructure 157 serves as a wide area network (WAN) and connects homes 170 and computers 180 in office complexes to the cable head-end 150. Block 170 is a computer which could reside at a customers residence. A cable receiver 171 is installed within the computer 170 which listens for signals on the hybrid fiber coax infrastructure 157. The cable receiver 171 converts the signals into computer data and passes them on to the computer 170. Optionally, the computer 170 stores the computer data in a hard drive 172.

Block 180 is a computer in an office complex. The computer 180 is equipped with a cable receiver 181 which receives data over the hybrid fiber coax 157 WAN. Optionally, the computer can be equipped with a modem 184 which receives data from an ISP 140 over a switched or dedicated telephone line 142. Optionally, the computer 180 stores the computer data in a hard drive 183 and/or transmits the computer data over a LAN 190 by means of a LAN adapter 182. Information is transmitted on each of these networks (LAN 190, WAN 150) in appropriate units of measure. For example, in a digital network, information is transmitted from a computer in bits. Depending on the hardware protocol, the bits may be grouped together into payload data units (PDUs), often referred to as bytes, packets, or cells. Computers communicating to each other via modems on a switched or dedicated telephone line 111, 141, 142 will typically send and listen for seven or eight bit bytes. Computers communicating over an ethernet or Token Ring network will send and receive 'packets', groups of eight bit bytes, of a varying length (typical packet sizes range from 296 to 65535 bytes). And, computers communicating to each other through the Asynchronous Transfer Mode (ATM) protocol will send and listen for 'cells', groups of eight bit bytes of a fixed length (53 bytes).

When payload data units are transmitted over a shared network such as a Token-Ring or ethernet network, the payload data units contain a destination address field. This destination address field will contain an identifier indicating which computer should receive the payload data and which computers should ignore it. In the case of ethernet or Token-Ring networks, this identifier is a MAC (Media Access Control) address. These identifiers are unique to each physical network adapter. When an ethernet adapter receives a payload data unit, it compares the value stored in the payload address field against its own configured MAC address. If the two values match, the adapter notifies the network computer and transfers the payload data unit into the computers memory. If no match is found, the adapter discards the payload data unit.

Each payload data unit contains at most one destination address. Because computers may wish to simultaneously transmit data to many network connected computers, certain destination addresses are reserved as broadcast addresses. On an ethernet network with computers connected through IP (the Internet Protocol), the IANA (Internet Assigned Numbering Authority) has reserved a block of MAC addresses to be used for broadcast. When an ethernet adapter receives a payload data unit which contains a broadcast MAC address in its destination address field, the adapter either notifies its network computer (client) and transfers the payload data unit into the computer's memory, or it compares the MAC address against a table of broadcast MAC addresses which its network computer has previously created. If the MAC address is listed in the table, the network computer is notified and the payload data unit is transferred. Otherwise, the payload data is discarded.

Network connected computers broadcast data onto a computer network in many different circumstances. For instance, as part of the process of becoming connected to an ethernet IP network, a computer will announce itself by broadcasting its MAC address over the network. Network routing processes 158 listen for these announcements and configure their routing tables appropriately. And, when a network computer wants to transmit an IP packet to an IP address, the computer will broadcast an address query across the network asking for the MAC address corresponding to the computer with the IP address.

Network connected computers may also broadcast data files across a computer network. A network connected computer acting as a data server may, for instance, continually broadcast stock ticker reports, news, or weather information. Additionally, data files from the World Wide Web may be broadcast. Network connected computers which receive these files can store them in a cache on a hard drive for quick retrieval at a later time.

Other systems, e.g. the PointCast network (a trademark of PointCast, Inc.), one or more clients on the network are executing software that periodically sends a query to one or more servers for various selected categories of information. Here each of the users is requesting a separate copy of the information and therefore network bandwidth is used to send each of these users the information. In addition, network bandwidth is used to send each of the requests (and required "handshaking") to the server.

Hughes Network Systems, Inc. provides a broadcast service that broadcasts customer provided information (e.g. MPEG video) from a satellite to various ground users. The ground users have an adaptor that is capable of receiving the customer information. The customer information is assigned a broadcast address and each of the ground users interested in the customer information listens for that address by tuning the adaptor with the correct broadcast address. When the customer information is broadcast, the ground users that are "tuned" to the broadcast address can access the customer information for display, etc. In this system each user/client receives and must somehow process all of the customer information, whether or not the user is capable of handling it.

STATEMENT OF PROBLEMS WITH THE PRIOR ART

The prior art fails to account for the difference between the speed at which data can be transmitted over a modern computer network, the speed at which it can be processed by a fast computer and the speed at which it can be processed by a slow computer. An information provider may want to send a large amount of information at a high rate of speed, but the information providers are currently limited by the processing speed of their slowest receiving customer's computer.

The information providers do not have a simple, economical, means for customers with slow computers to limit the information which is being received into their computers. Currently, all information which is transmitted over a network on a 'tuned' broadcast address is read into the customers network adapter and passed on into the customers computer. If the information is broadcast too quickly for a customer computer, the customer computer may lose random pieces of the information. In a broadcast model, the customer has no way of telling the information provider that data is being lost or asking the information provider to retransmit data. Therefore, there is a chance that the information will be lost forever to the customer.

In order to provide for slow speed computers, information providers will often broadcast two or more versions of their information or schedule rebroadcasts of the entire information. The information versions can differ in the amount of detail they contain. One version may contain full detail and one may be abridged. In providing multiple versions or rebroadcasts of information, information providers are consuming bandwidth by duplicating information which would otherwise not be needed. An example of this is an option offered to a client on the internet to receive a less detailed text version of a web page as opposed to a more detailed web page with images.

Another method that information providers may use to accommodate slow speed computers is to broadcast the information on two or more broadcast addresses. An information provider which broadcasts news could, for instance, broadcast the stock report portion of the news on one address, weather information on another, while simultaneously transmitting all other information on a third broadcast address. This allows customer computers to select any combination of the broadcasts that they are interested in. There are several problems with this approach, however. Information often cannot be segmented easily into distinct categories and the categories chosen by an information provider may not necessarily yield suitable combinations for all customers. For instance, in the above example, customers who were interested in only the sports portion of the news would still be required to receive and process all of the broadcast information which was transmitted over the third broadcast address even though the sports related information may consume only a small fraction of the bandwidth. Information providers who broadcast on two or more broadcast addresses have to make trade-offs between segmenting information into categories which customers are interested in and categories that consume significant portions of network (and/or customer processing) resources.

There are a limited number of addresses which are available for broadcasting. The numerical space which these addresses are allocated from is shared by all information providers on a network. And on the customer computer side, each broadcast address which is 'tuned' to by the computer requires resources on the computer. Tables are maintained by the operating system running on the computer for each broadcast address, and additional computing resources are needed to reassemble the multiple broadcast streams of information into one stream. Therefore, information providers need to take care to reasonably limit the number of concurrent broadcast addresses which they are using at any given time.

Client computers often run unattended while receiving and storing broadcasted information. An example of this is a computer which is used to receive broadcast news information transmitted during night hours. The news information may then be presented to users in the morning before they go to work or for their perusal during their commute. Modern computer networks have the capability to transmit data at high rates of speed (such as 30 Mbits/second). Over the span of several hours, a listening computer could run out of storage space if it tried to store all received information. If a computer ran out of space, it would be forced to either release storage resources by discarding previously stored data or to discard all new incoming data. Hence, information providers also need to consider the amount of information which is being received by even the fastest of their customer computers.

OBJECTS OF THE INVENTION

An object of this invention is an improved system and method that is capable of receiving large amounts of broadcast information at high rates of speed without over loading the resources of the receiving (client) computer.

An object of this invention is an improved system and method that is capable of receiving large amounts of broadcast information at high rates of speed and filtering out unwanted portions of the information using network protocols.

An object of this invention is an improved system and method that is capable of optimally using broadcast servers, equipment, and networks to broadcast information at high rates of speed.

SUMMARY OF THE INVENTION

The present invention is a filter adaptor that connects a computer to a network through a network connection. The network has a large plurality of broadcast type messages having a given protocol. Each of the broadcast messages has a destination field and a source field. The adaptor has a preference list of one or more fixed channels that the computer is capable of receiving. Each fixed channel has a channel identifier that is also listed in the preference list. Further, the filter adapter has a filtering process that monitors the source field and discards any message that does not have a source identifier in the source field that matches one of the channel identifiers on the preference list. The filter adapter is responsive to various commands from the network that change entries in the preference list.

Through a category list the computer user can select which of the channels are selected/discarded based on the content (categories) transmitted on the respective channel.

BRIEF DESCRIPTION OF THE DRAWINGS

The foregoing and other objects, aspects and advantages will be better understood from the following detailed description of preferred embodiments of the invention with reference to the drawings that are include the following:

FIG. 5A is a block diagram of an ethernet message data structure having a destination field, a source field, and a payload that optionally contains one or more commands.

FIG. 5B is a block diagram of a Asynchronous Transfer Mode (ATM) message data structure having a Virtual Connection Identifier, optional miscellaneous fields, and a payload that optionally contains one or more commands.

FIG. 5C is a block diagram of a Internet Protocol (IP) message data structure having an destination field, a source field, and a payload that optionally contains one or more commands.

DETAILED DESCRIPTION OF THE INVENTION

Figure 1:
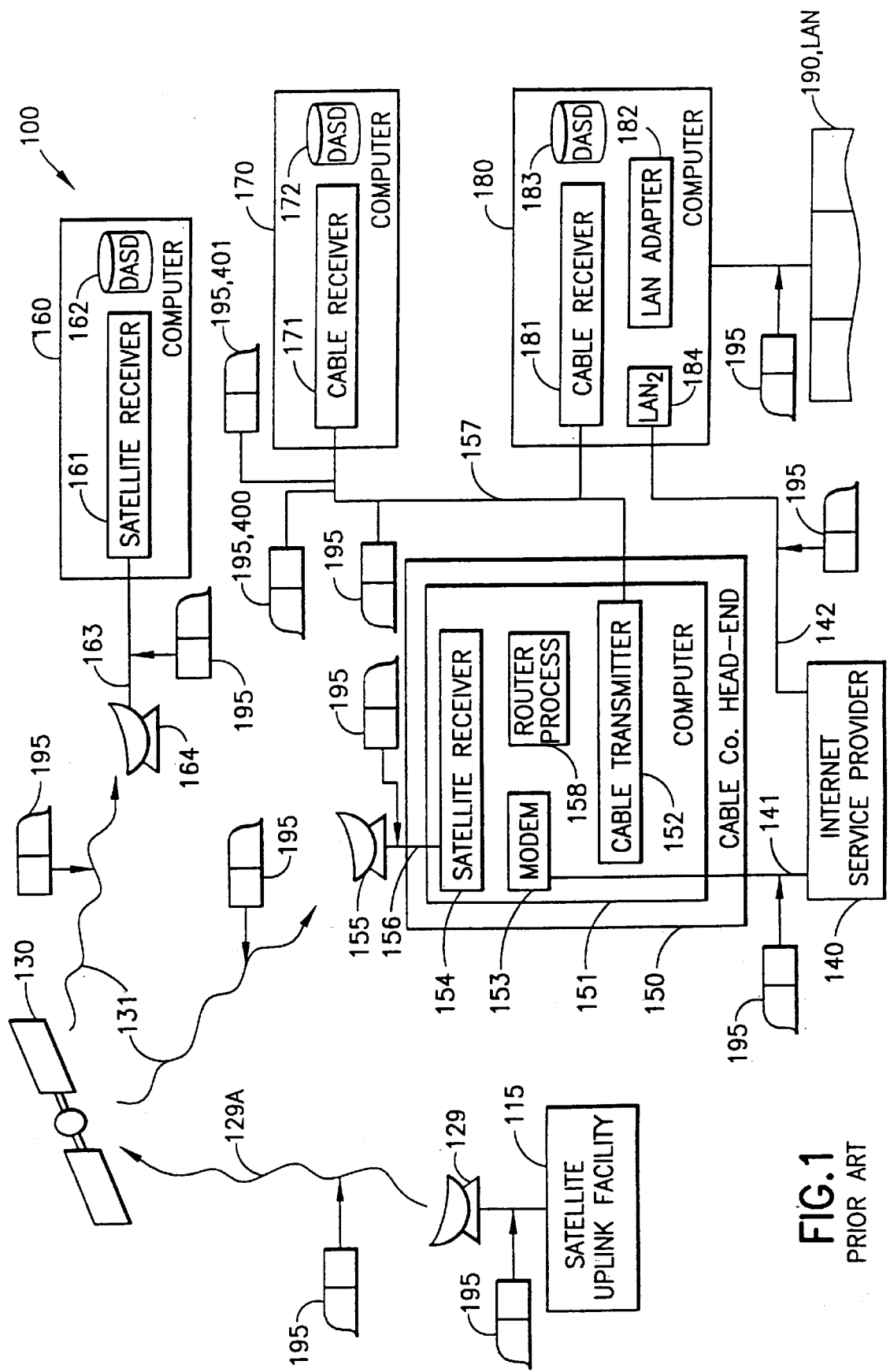
FIG. 1 is a block diagram of a prior art system for broadcasting information using network protocols.
Figure 1A:
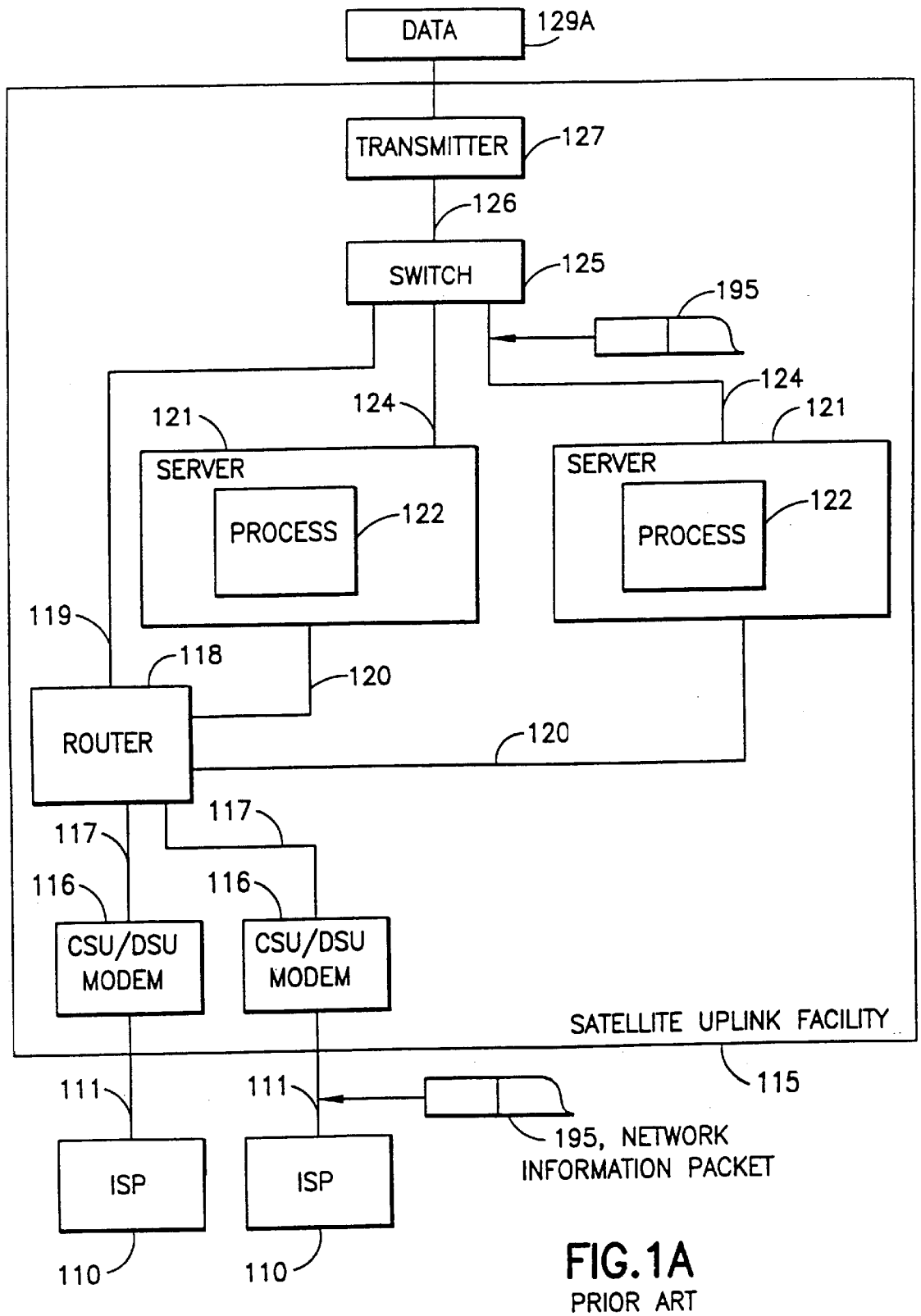
FIG. 1A is a block diagram showing the detail of a satellite uplink facility.
Figure 2:
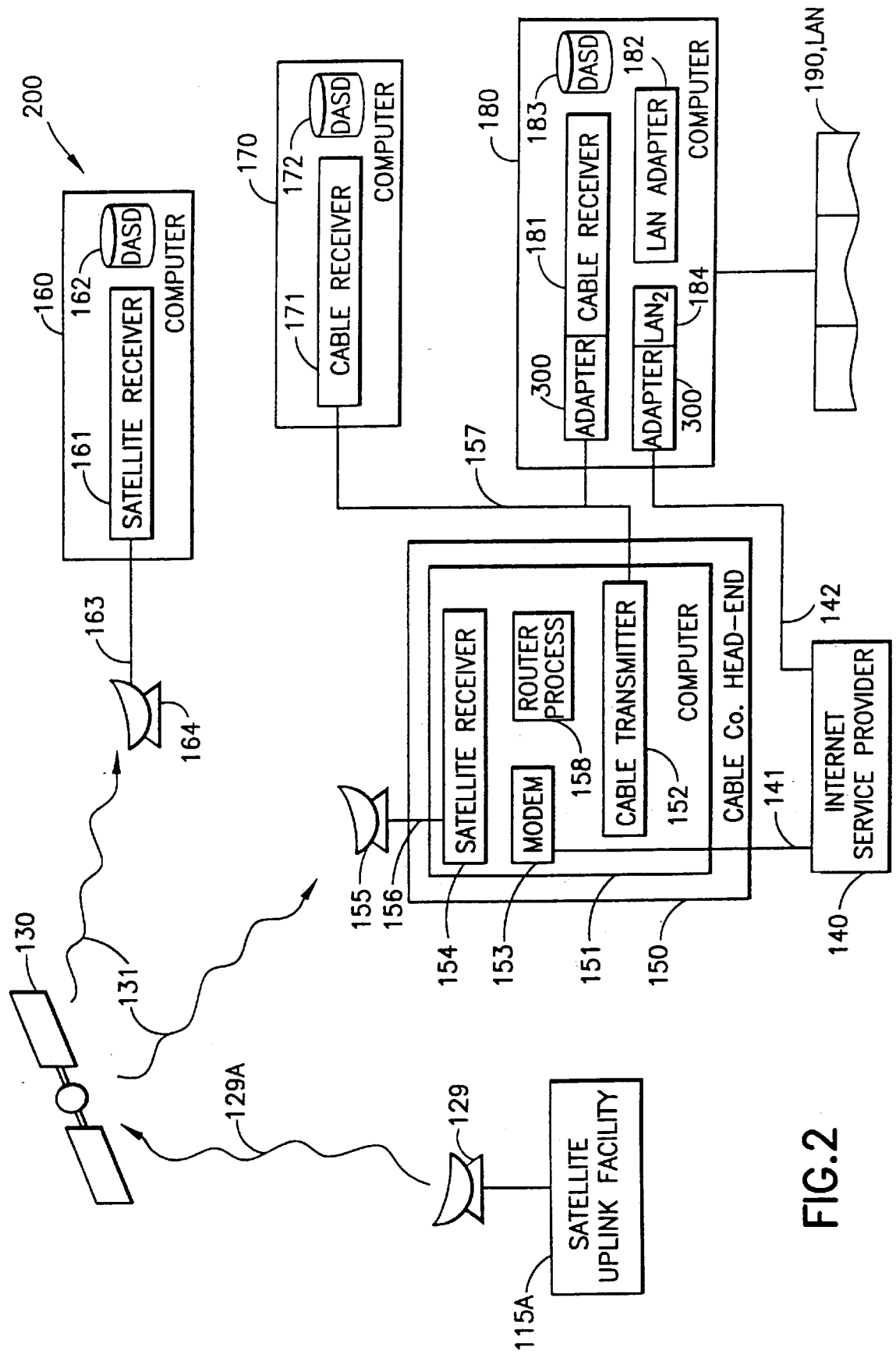
FIG. 2 is a block diagram of a system for filtering broadcast type using the present novel filter adaptor.

FIG. 2 is a block diagram of a system 200 for filtering broadcast type messages using the present novel filter adaptor 300. Blocks in common with those in FIG. 1 are given the same block number and are described above. A preferred embodiment of the invention comprises two novel processes: a server process 1000 that executes on one or more servers 121 on the network. Note that there can be many embodiments of this server 121. For example, the server 121 can be part of a (satellite) communication ground station 120 that transmits radio communications to a remote transmitter 130 that can include a ground antenna (e.g. a TV or radio antenna), a communications satellite, a microwave transmission antenna. Alternatively, the server 121 is connected to any general network (142, 157) like the internet, a wide area network, a local area network, and/or a cable network. These networks (142, 157) can use any generally known protocol for communication. Alternatively, the server 151 can be a computer 151 with access to databases and/or information sources (e.g., libraries and/or real time information like news). This server 151 may or may not have a radio communications link.

In a preferred embodiment, the adaptor 300 is a process that executes or hardware that performs on an interface to any one or more of the networks (142, 157).

Figure 3:
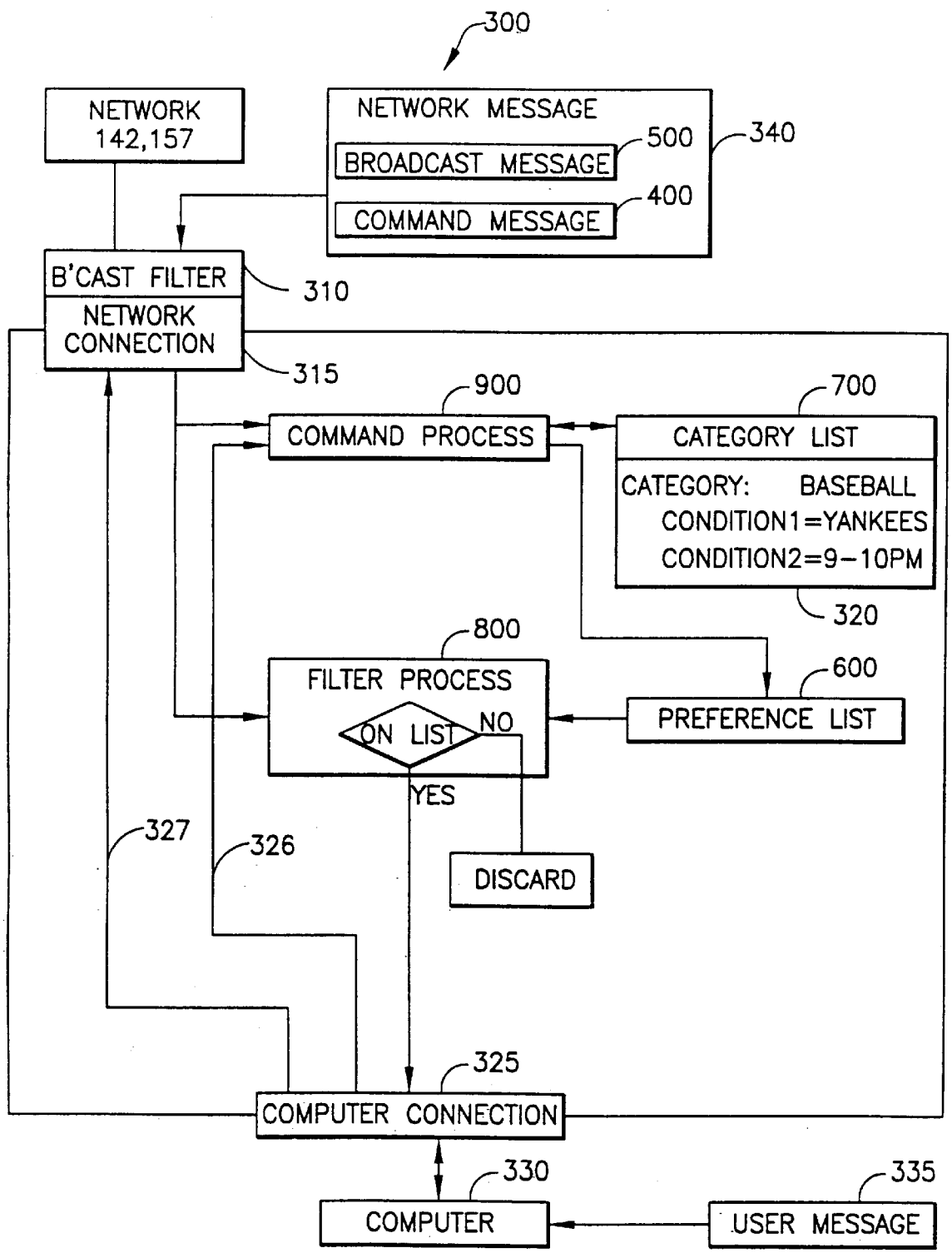
FIG. 3 is a block diagram showing the architecture of of the filter adaptor used with a receiving (client) computer on a network.

FIG. 3 is a block diagram showing the architecture of of the filter adaptor 300 used with a receiving (client) computer on a network. This adapter 300 receives one or more network messages 340 from the network(s) (142, 157) through a network connection 310. The network messages 340 can be, but are not limited to, broadcast messages 500, and command messages 400. Broadcast messages 500 and command messages 400 are explained in FIGS. 5 (5A–5C) and 4 below, respectively. Upon receiving a network message 340, the network adaptor 300 performs a prior-art filtering process 310. This filtering process 310 discards any network messages which are not addressed to the attached computer 330.

After the prior art filter process 310 passes a network message 340, the network adapter 300 executes a filter process 800 if the network message 340 is a broadcast message 500. If the network message 340 is a command message 400, the adaptor 300 executes process 900.

The novel filter process 800 is a process which conditionally discards or accepts broadcast messages 500. The conditions that the filter process 800 uses to determine when to accept or discard broadcast messages 500 are maintained in a preference list 600. This process 800 is described in FIG. 8 below. The preference list 600 is described in further detail in FIG. 6 below.

The command process 900 is a process which reads the values inside a command message 400 and conditionally updates a category list 700 and/or the preference list 600. The category list 700 is a list which contains conditions that instruct the command process 900 how to update the preference list 600. The category list 700 is described in FIG. 7 below. The command process 900 is described in more detail in FIG. 9 (9A–9D) below.

After conditionally executing the filter process 800 and/or the command process 900, the network adapter 300 transfers the network message 340 to the connected computer 330. This data transfer is done through the computer connection 325. These computer connections are well known and can include: a computer system and/or data bus, a serial connection, e.g. RS-232, a parallel connection, any one or more of the networks described above, e.g. 142, 157.

In alternative embodiments, the network adapter 300 is also capable of receiving a user message 335 from the connected computer 330 through the computer connection 325. Here the computer connection 325 can be bidirectional. The user message 335 is routed 326 to the command process 900 if it 335 is a command message 400. Otherwise, the user message 335 is routed 327 to the network connection 310 using well known techniques.

In this invention, packets 195 (e.g. in any general protocol like ethernet/token-ring frames 591, ATM cells 592, and IP datagrams 530) sent over the network(s) (111, 126, 129A, 131, 141, 142, 156, 157, 163, and 190) have information that identifies that the packet 195 contains either a command payload 400 or a channel payload 401 (in FIG. 1). A channel payload 401 uses a source identifier field, as described below, to contain channel id information (like that 430 in the command payload 400) which process 900 uses to determine whether the channel payload 401 packet 195 is processed or discarded. FIG. 5A is a block diagram of an ethernet message data structure, i.e., an ethernet frame 591, has a destination field 502A, a source field 504A, and a payload 506A. (In one embodiment, the network 157 is an ethernet network.) The payload 506A optionally contains one or more commands 400. These commands 400 are the same as described above. The payload 506A also optionally contains an ethernet message. An ethernet frame 591 may also contain other known fields 508A, such as an ethernet type. The architecture of ethernet frames is well known.

Figure 4:
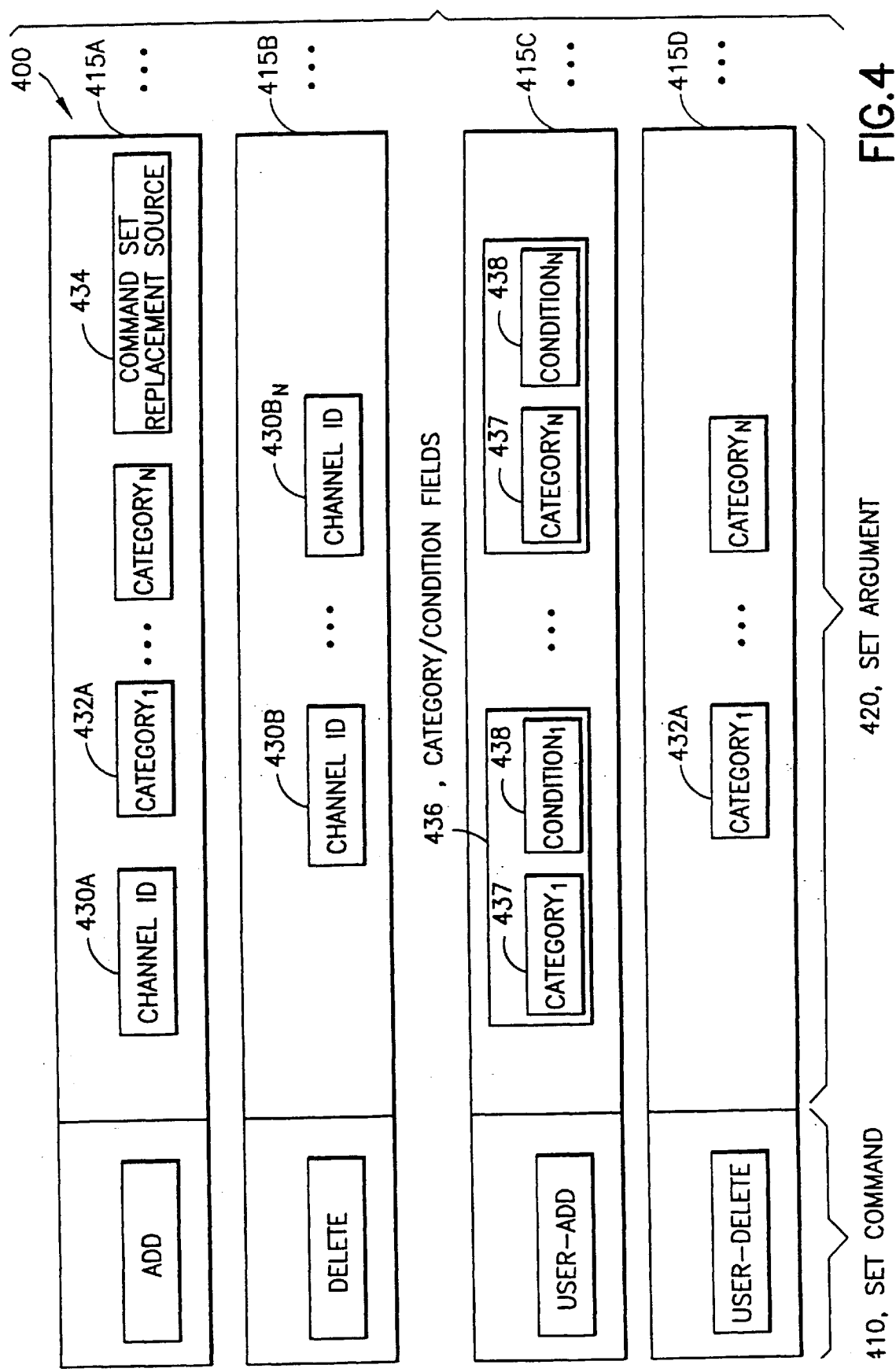
FIG. 4 is a block diagram of a typical message data structure having an optional destination field, a source field, and a payload that optionally contains one or more commands.

FIG. 4 is a block diagram of a typical message data structure having an optional command destination field 402, a command source field 404, and a command payload 406 that contains one or more payload commands 410. Each payload command 410 contains one or more command sets, typically 415. Each of the command sets 415 further contains a command set command 410 and a command set argument 420, where the command set argument has one or more command fields. The optional command destination field 402 contains an address of the network adaptor 300 or a general broadcast address. These addresses are known. The command source field 404 contains any identifier that identifies the message as a command message.

In a preferred embodiment, there are four types of command sets 415: an add command set 415A, a delete command set 415B, a user-add command set 415C, and a user-delete command set 415D.

The add command set 415A is used by process 900 to (conditionally) add a channel identifier to the preference list 600. The channel identifier added to the preference list 500 is contained in a channel identifier field 430A (typically 430). The add command set 415A can optionally have one or more command set categories 432A (typically 432). These command set categories 432 are identifiers, e.g. numeric identifiers. In a preferred embodiment, the command set categories 432 identify potential categories of interest to the user (e.g. a subscriber). Examples of these command set categories 432 are: Spanish language, basketball, opera, rock and roll, etc. The add command set 415 can also optionally include a command set replacement source 434. This field contains an identifier that identifies the source of a broadcast message, e.g. a TV station name or more specifically a computer network address at the TV station.

The delete command set 415B is used by process 900 to delete a channel identifier from the preference list 600. The channel identifier to be deleted from the preference list 500 is contained in a channel identifier field 430B (typically 430).

The user-add command set 415C is used by process 900 to add one or more pairs of categories and conditions to the category list 700. The categories and condition pairs are contained in the category-condition fields 436. The category field 437 contains the name of a category, as described in 432 above. The (optional) command set condition field 438 contains a condition which is used by the command process 900 to determine if a channel identifier 430A within an add command set 415A should be added to the preference list 600. These command set conditions are blocks of binary data. The data being composed of conditions. Examples of the conditions are: "A and B" which is a condition that is true if sub-conditions A and B are true. "A or B" which is true if sub-condition A and/or sub-condition B is true. "E1<E2" which is true if expression E1 is less than expression E2. "E1 in L" which is true if expression E1 is contained in the list of identifiers L. Other conditions can be used. For example: greater than, greater than or equal to, or any other known logical comparison.

The user-delete command set 415D is used by process 900 to delete one or more categories (and their optional associated conditions) from the category list 700. The categories are contained in the command set category field 432 and are described above.

FIG. 5A is a block diagram of an ethernet message 195 architecture. The ethernet frame 591 is the basic data structure which is used by network connected computers to communicate over an ethernet network. The ethernet destination field 502A contains an ethernet address which is an identifier. This address is typically either a unicast address or a broadcast address. A unicast address is the network identifier of a connected computer. A broadcast address is also an identifier, however instead of identifying a single connected computer, it identifies the frame as being a particular broadcast message. Broadcast identifiers range numerically from 00005e000000 to 00005effffff in hexadecimal.

The ethernet source field 504A also contains a network identifier. This identifier typically identifies the computer which transmitted the ethernet frame 591 onto the ethernet network. The ethernet source field 504A can be used to discriminate one ethernet frame from another based upon sender.

In a preferred embodiment, when the ethernet frame 591 contains a set command 400, the ethernet source field 504A novelly contains a set command identifier 510A. As described above, examples of a set command identifier 510A include: add, delete, user-add and user-delete. When the ethernet frame 591 contains the channel payload 401A, the ethernet source field 504A contains a channel identifier, e.g. channel 5.

FIG. 5B is a block diagram of an alternative packet 195 architecture called Asynchronous Transfer Mode (ATM). The message data structure having a Virtual Connection Identifier, or VCI 504B, optional miscellaneous fields 505B, and a payload field 506B. These fields are well known. In some preferred embodiments, the payload field 506B optionally contains one or more commands 400 or a channel payload 401. The VCI 504B novelly contains a set commands identifier 510A or a channel identifier 510B, respectively. As described above, examples of a set command identifier 510A include: add, delete, user-add and user-delete. An example of channel identifier would be channel 5.

FIG. 5C is a block diagram of an alternative packet 195 architecture called Internet Protocol (IP). The IP datagram 530 has an IP destination field 502C, an IP source field 504C, and an IP payload field 506C. These fields are well known. In some preferred embodiments, the IP payload field 506C optionally contains one or more commands 400 or a channel payload 401. The IP source field 504C novelly contains the set command identifier 510A or the channel identifier 510B, respectively.

Figure 6:
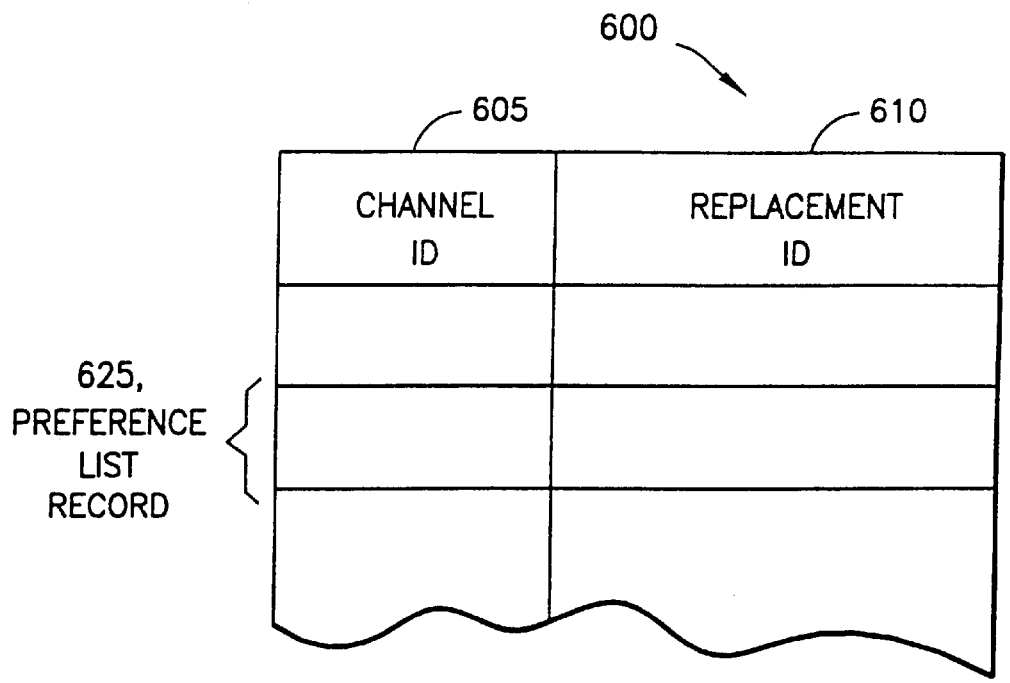
FIG. 6 is block diagram of a preference list used by the adaptor.

FIG. 6 is block diagram of a preference list 600 used by the adaptor 300. The preference list 600 comprises a plurality of preference list records 625. Each preference list record 625 has a channel identification field 605 and a replacement identification field 610 associated with one another. The channel identification field 605 contains the channel identifier 510B. The replacement identification fields 610 contain source identifier as described in the add command field 430 description above. Process 900 replaces the channel identifier 510B of each selected packet 195 with the replacement identification 610.

Figure 7:
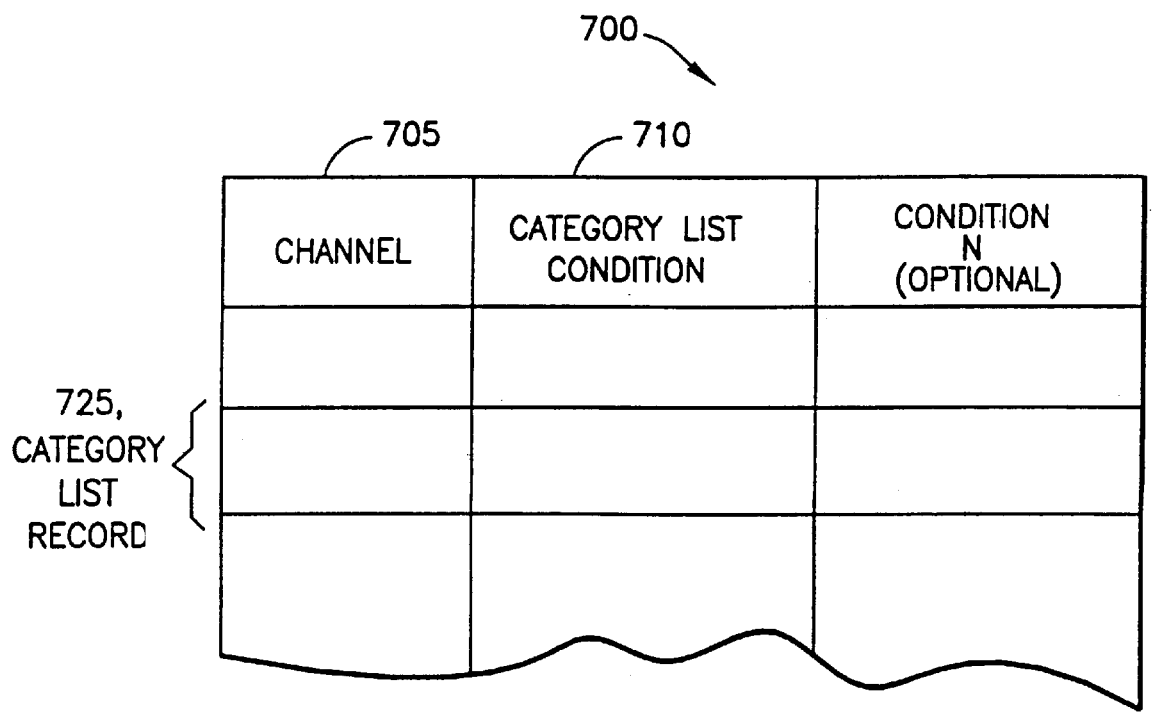
FIG. 7 is block diagram of an optional category list used by the adaptor.

FIG. 7 is block diagram of an optional category list 700 used by the adaptor 300. The optional category list 700 has a plurality of category list records 725. Each category list record 725 has a category field 705 and zero or more category list conditions 710 associated with the respective category field 705. Process 900 populates the category field 705 and the category list conditions 710 with the information, i.e., the category list pair 436 (the category 437 and the condition(s) 438, respectively) in the respective user-add and user-delete command sets.

Figure 8:
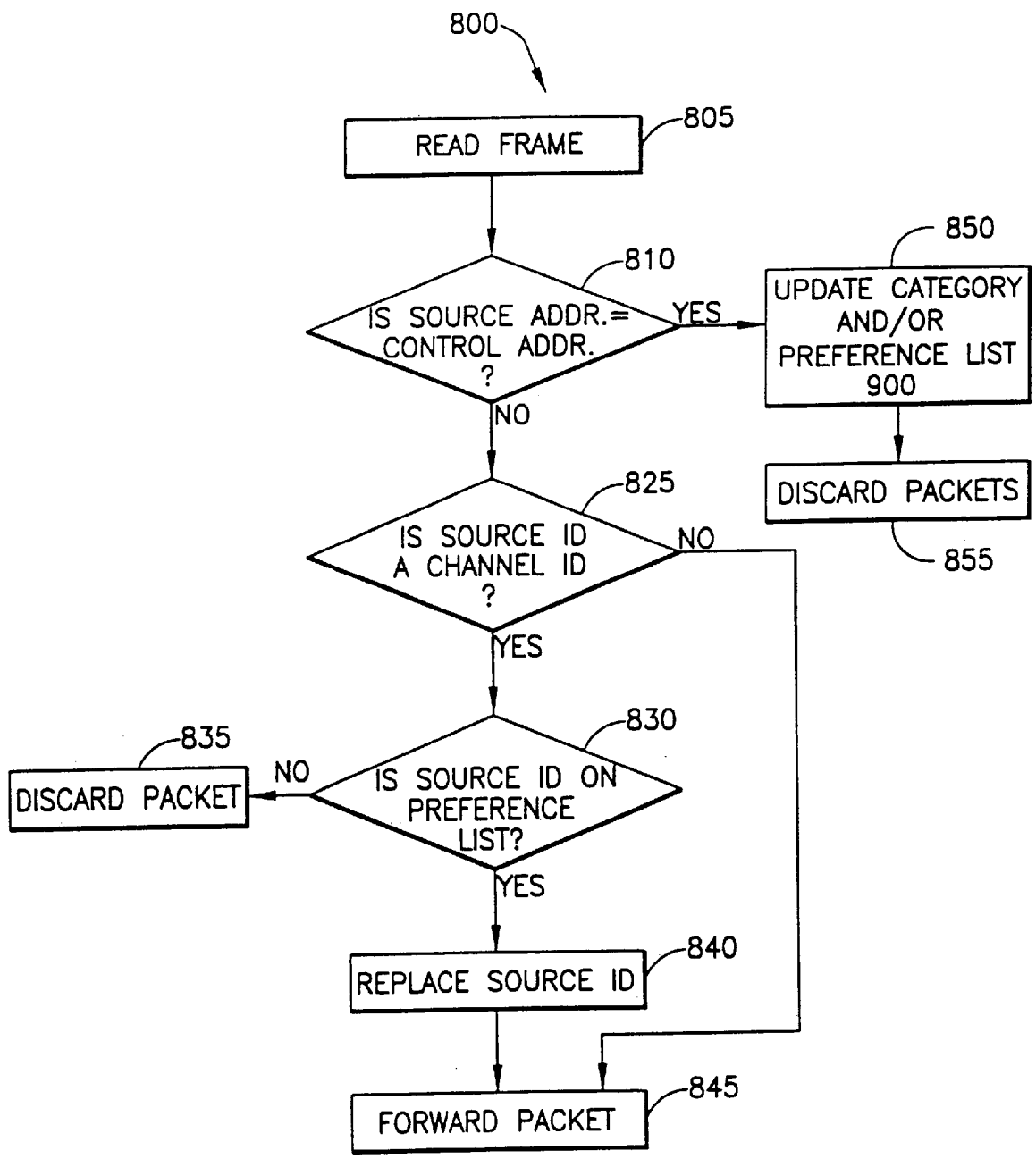
FIG. 8 is a flow chart of a filter process.

FIG. 8 is a flow chart of a filter process 800 that is executed by the adapter 300. Process 800 begins at step 805 by reading a packet 195 from the connected network e.g. 157. Step 810 examines the source identifier 504 in the packet 195. The source identifier is 504A,B,C (504) for ethernet networks, ATM networks, or IP networks, respectively. If the source identifier 504 is a set command identifier 510A, the process branches to step 850. If not, the process continues at step 825.

In step 850, process 900 is called in order to update the preference list 600 and/or category list 700. After this, step 855 discards the packet 195 and no further processing is done for the packet 195.

In step 825, the process 800 determines whether the source identifier 504A,B,C (504) is a channel identifier 510B. If it is not, the process 800 jumps to step 845. If it is, the process 800, in step 830 determines if the source identifier 504 is on the preference list 600. If the source identifier 504 is not on the preference list 600, the packet 195 is discarded in step 835. In this way, packets 195 with channel identifiers 510B that the user has not designated are not forwarded by the adapter 300 to the connected computer (170,180). Accordingly, the invention allows the user system (170,180) to receive only packets and categories designated by the user and not to be burdened with the processing of any other packets being broadcasted on the network(s).

In a preferred embodiment, the number of channel identifiers are limited, preferably in a range. In this manner, the adapter 300 can determine if the source identifier 504 is a channel identifier 510B very quickly by first eliminating any packets with a source identifier 504 that falls outside of the range.

In step 840, if the source identifier 504 is a channel identifier 510B which is on the preference list 600, the source identifier 504 is replaced with its associated replacement identifier 610. Therefore, the replacement identifier 610 will have the information that the user system (170,180) will use to identify the source of the packet 195 passed on by the adapter. Hence, using this invention, an information provider would first send an add-channel command 415A to designate the channel identifier 605 of a program and associate that channel identifier (program) with the replacement identifier 610 which is the actual address of the source providing the program. For example, a source named soccer.spanish.com providing a particular soccer game could first send an add-channel command 415A loading the channel identifier 5 in field 605 and the station identifier soccer-.spanish.com in the field 610. When a packet 195 containing the channel identifier 5 is received by the adapter 300, process 800 then replaces the channel identifier 5 with the actual source identifier, soccer.spanish.com. In this way, an adapter can use a limited number of preference records 625, e.g. 32, to access an infinite number of predesignated information sources. This designation can be performed by the broadcast source. Further, this can be done in a dynamic manner through the use of the add and delete commands 415A, 415B, respectively.

After step 840, the packet 195 is forwarded to the connected user computer (170, 180) by step 845. Therefore, the packets which are in a category selected by the user are processed by the user computer (170,180). In addition, packets 195 processed in step 825 as having the source identifier 504 which is not a channel identifier 510B are also forwarded for processing to the user computer (170,180) as described above. This permits packets 195 that do not use the architecture of this invention to be processed by the user computer (170,180) without interference.

In an alternative preferred embodiment, information providers can maximize the use of their communication infrastructure (e.g. networks 131, 129A, 142, 157, and other resources 120, 129, 130) by multiplexing the information over this infrastructure. In order to do this, a first set of information having a first duration is sent to a first set of users that have a given channel identifier 605 in their preference list 600. Then the information provider can send an add command 415A over the infrastructure/network which would redefine the given channel identifier 510B as containing a second set of information having a second duration of interest to a second set of users. (Note that if any of the first set of users have not designated interest in the second set of information through conditions 710 in the category list 700, process 900 will delete the given channel identifier from the channel identifier field 605 in their respective preference lists 600). Therefore, the information provider can send the second set of information to the second set of users during the first duration while the first set of users are still processing the first set of information. This method can be repeated for any given set of information so that all of the information can be transmitted using the same given channel. As long as the information provider sends a next set of first (second, etc) information to the first (second, etc) set of users (after reassigning the given channel identifier 605) before the end of the first (second, etc) duration, the users will be unaware that the information provider has transmitted other information over the given channel.

For example, the information provider sends five seconds worth of audio to a first set of users over channel 5 who have designated interest in audio per their category list 705 (see process 900). Because the information provider can send this information in a short period of time (e.g. one second), the information provider sends an add command 415A with a channel identifier 430A of 5 and a category 432A of a news stock ticker. Process 900 then changes all the users preference lists 600 by adding or deleting the channel identifier 605 of channel 5. Then the information provider takes two seconds to send the new stock ticker information having a duration of five seconds. Then the information provider sends another add command 415A with a channel identifier 430A of 5 with a category 432A of sports images. Then the sports images with a duration of five seconds are sent in one second. Sometimes before the audio information has been processed by the users, the service provider sends another add command 415A with a channel identifier 430A of 5 and a category 432A of audio. Process 900 in the user systems then returns the channel identifier 430A of 5 to the channel identifier 605 in the preference list 600 for the first set of users. Then the information provider sends a second segment of audio information to the users. This process is repeated for the other uses of channel 5. In this way, the users never see an interruption of the audio (stock, image, etc) information on their connected computers. Note that information with different duration, transmission times, can be handled by using known methods, for example the "Leaky Bucket Algorithm".

By using this time multiplexing, many types of information can be broadcast to a large number of users on a network infrastructure by using a small or limited number (range) of channel identifiers. Therefore, by checking whether or not the channel identifier 502 on a packet 195 is within this range, an adapter 300 can quickly determine if the information on the packet is of interest to the user and needs to be processed by the user.

Figure 9A:
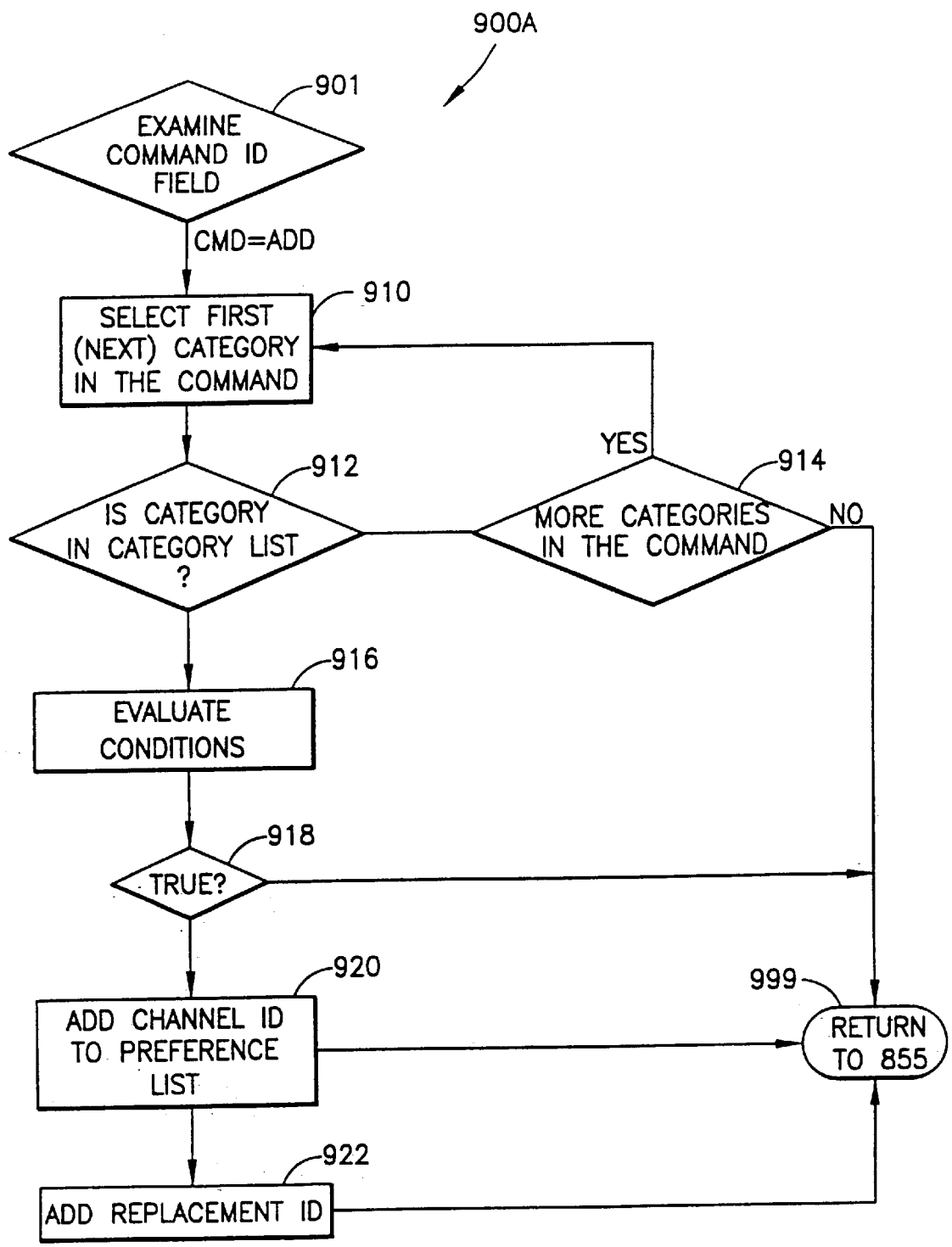
FIG. 9A is a flow chart of the command process for an add command.

FIG. 9A is a flow chart of the command process 900A for processing an add command. In step 901, the command identifier field 410 is examined to determine what type of command is being processed. If the command is an add command step 910 selects the first (next) category from the given categories 432A–432N in the command 400. In step 912, the selected category 432A–432N is compared to the categories 705 listed in the category list 700. If the selected category 432A–432N is not found in the category list 700, step 914 checks if there are more categories 432A–432N in the command 400 and, if there are, returns to step 910. If there are no more categories in 432A-432N, the process returns in step 999.

If one of the categories 432A–432N is found on the category list 700, the associated conditions 710 are evaluated in step 916. If the evaluated conditions 710 are not true 918, process 900A returns to process 800. If the evaluated conditions are true, the process 900A continues to step 920 and adds the channel identifier 430A to the preference list 600 channel identifier field 605. If the channel identifier 430A is already in the preference list 600, process 900A does not add a second record to the preference list 600. In step 922, the replacement identifier 434 is added to field 610 in the preference list record 625 having the newly added channel identifier 605. Then process 900A returns to step 855.

Figure 9B:
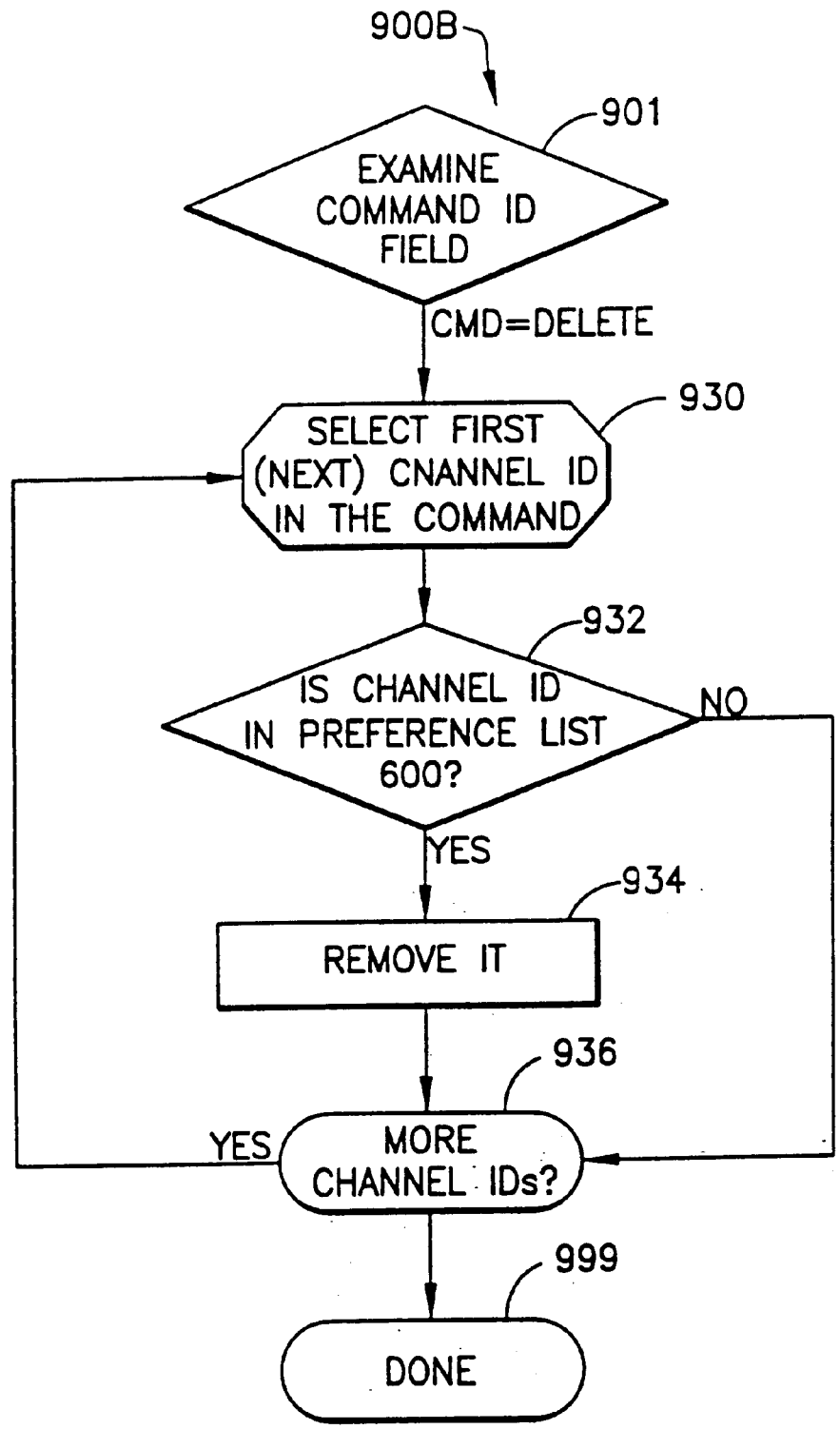
FIG. 9B is a flow chart of the command process for a delete command.

FIG. 9B is a flow chart of the command process 900B for processing a delete command. This process 900B allows an information provider to instruct all users to stop forwarding packets 195 having a source identifier 504 which is equal to a given channel identifier 510B. Upon receiving the delete command, the user adapters 300 remove the associated preference list record 625 in the preference list 600 (if one exists). This allows the preference list 600 to be kept up-to-date and contain only preference list records 625 for channel identifiers 510B which are currently in use by the information provider. This pruning of the preference list 625 also helps to speed up the search over the preference list 600 which is done in step 830 (see FIG. 8 above). Note that after deleting a preference list record 625 associated with a given channel identifier 510B, the channel identifier 510B may be reused (to support multiplexing see FIG. 9A) with the add command.

In step 901, the command identifier 410 is examined to determine what type of command is being processed. If the command is a delete command step 930 selects the first (next) channel identifier 430B from the given categories 430BA–430BN in the command 400. In step 932, the selected channel identifier 430BA–430BN is compared to the channel identifiers 605 in the preference list 600. If the channel identifier 430BA–430BN is not found in the preference list 600, step 936 checks if there are more channel identifiers 430BA–430BN in the command 400 and, if there are, returns to step 930. If there are no more channel identifiers in 430BA–430BN, the process returns in step 999. When one or more of the channel identifiers 430BA–430BN are found on the preference list 600, the associated preference list record 625 is removed from the preference list 600.

Figure 9C:
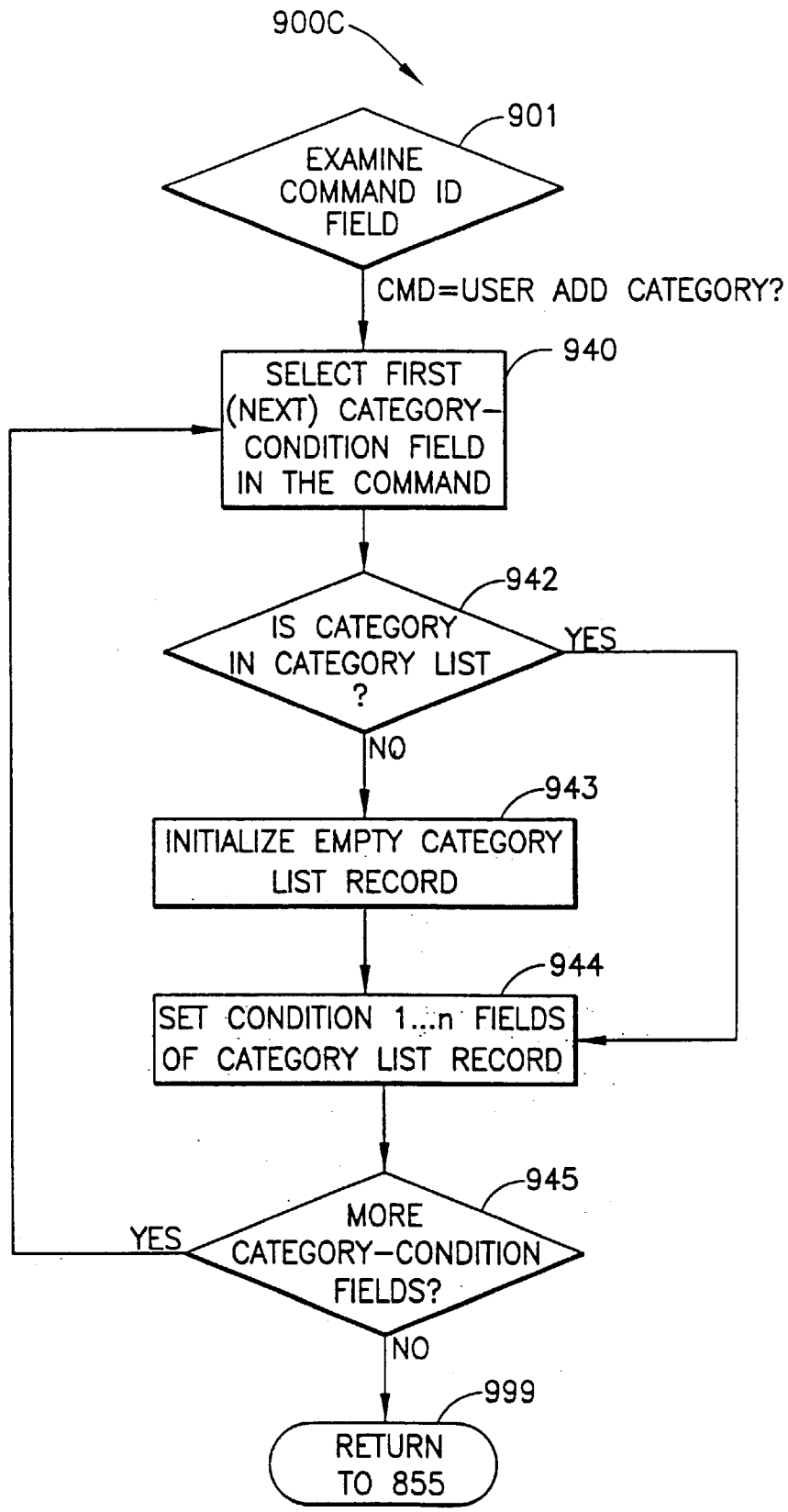
FIG. 9C is a flow chart of the command process for a user add category command.

FIG. 9C is a flow chart of the command process 900C for processing a user add category command. This process 900C allows a connected computer 330 to identify to the network adapter 300, categories 437 of interest or disinterest. This category information is stored by the network adapter 300 in the category list records 725 of the category list 700.

In step 901, the command identifier 410 is examined to determine what type of command is being processed. If the command is a user add category command step 940 selects the first (next) category-condition field from the given category-condition fields 436A–436N in the command 400. In step 942, the category field 437 of the selected category-condition fields 436A–436N is compared to the categories 705 in the category list 700. If the category field 437 is not found in the category list 700, step 943 adds a category list record 725 to the category list 700. The category field 705 of the new category list record 725 is set to the selected category-field 437. Otherwise, the process continues to step 944.

In step 944, the process sets the (optional) condition field 710 of the associated category list record 725. The value for the condition field 710 is copied from the command set condition field 438 of the selected category-condition field 436A–436N.

The process continues to step 945 where it checks to see if there are any more category-condition fields 436A–436N in the command 400. If there are, the process branches back to step 940. Otherwise, the process returns at step 999 to step 855 of process 800 (see FIG. 8 above).

Figure 9D:
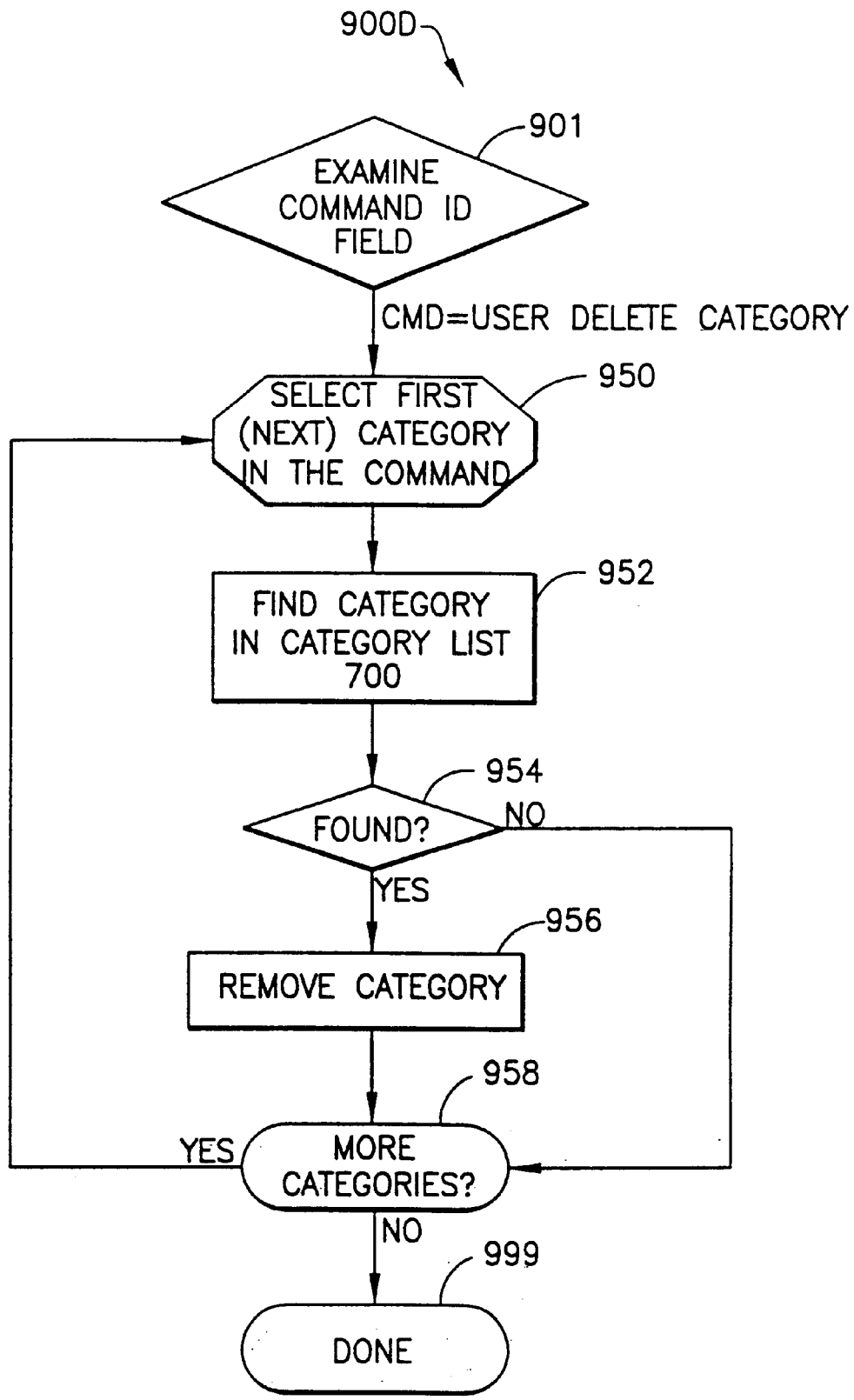
FIG. 9D is a flow chart of the command process for a user delete category command.

FIG. 9D is a flow chart of the command process for a user delete category command. This process 900D allows a connected computer 330 to tell the network adapter 300 to remove an associated category list record 725. By removing category list records 725, the adapter 300 can optimally search the category list 700 in step 912 of the add command process 900A (described above).

In step 901, the command identifier 410 is examined to determine what type of command is being processed. If the command is a user delete category command step 950 selects the first (next) category field 432 from the category fields 432A–432N in the command 400. In step 952, the selected category field 432A–432N is compared to the categories 705 in the category list 700. If the category field 437 is not found in the category list 700, the process branches to step 958. Step 958 checks the command 400 to see if it contains more category fields 432A–432N. If it does, the process returns to step 952. Otherwise, the process returns, step 999, to step 855 in process 800, FIG. 8.

When a category list record 725 is found in the category list 700 which contains the selected category 432A–432N, step 956 removes the category list record 725 from the category list 700. The process the continues to step 958.

Figure 10:
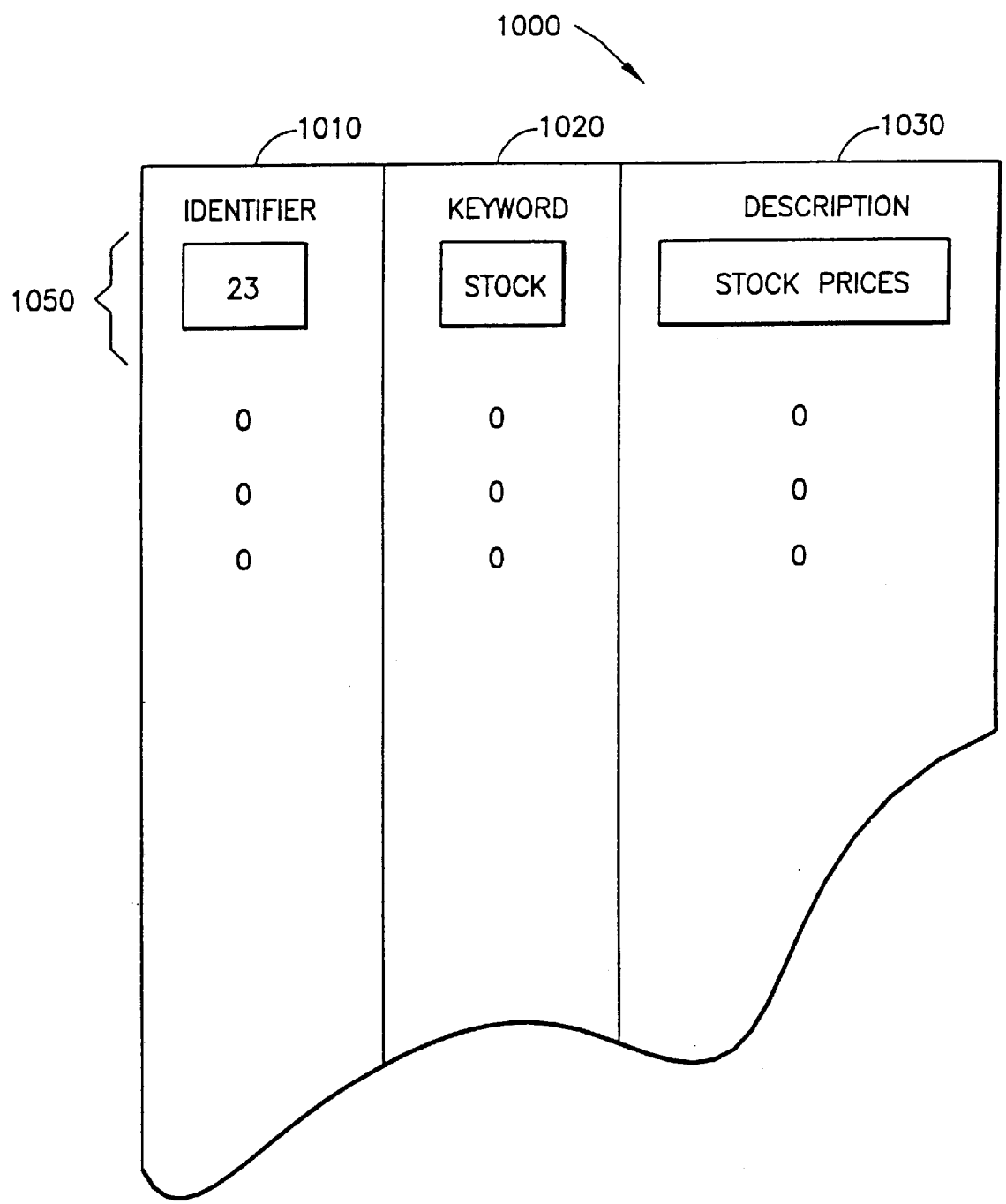
FIG. 10 is a block diagram of a data structure that correlates keywords and descriptions to category identifiers.

FIG. 10 is a block diagram of a data structure 1000 has a plurality of records 1050 that correlate keywords 1020 and descriptions 1030 to category identifiers 1010. This data structure 1000 is downloaded to computer 330 over the network 142, 157 from the network service provider 110, 140. The data structure 1000 is used to define the set of identifiers that are category identifiers e.g. 432. Typically, these are small numbers so that comparisons between identifiers can be performed quickly in step 912, FIG. 9 above. Further, the data structure provides the user with a list of valid keywords 1020 and descriptions 1030 associated with each category identifier 1010. Well known user interface process which execute on computer 330 can access this data structure 1000 and present information in the data structure to the user. The data in the data structure 1000 can be modified on request by the user to the service provider or can be updated periodically from the service provider through well known methods (e.g. ftp, the world wide web, the Pointcast network). For example, if the user wanted to receive information about stocks, he would access the data structure 1000 through the user interface and find that "stock" is a valid keyword. By selecting the "stock" category, the identifier 110 "23" will be placed in a category field 705 of a category list record 725 in the category list 700 by sending a user-add category command to the adapter 300 which would execute process 900C. In a similar manner, categories can be deleted by the user by reference of the data structure 1000 and process 900D.

The following description describes how a preferred embodiment of a server architecture that is used in the present system. This architecture is claimed in a patent application number xxxxx entitled "SYSTEM AND METHOD FOR USING A SERVER TO MULTIPLEX CHANNELS OF INFORMATION ON A BROADCAST NETWORK" which is filed on the same day as this application and herein incorporated by reference in its entirety.

Figure 11:
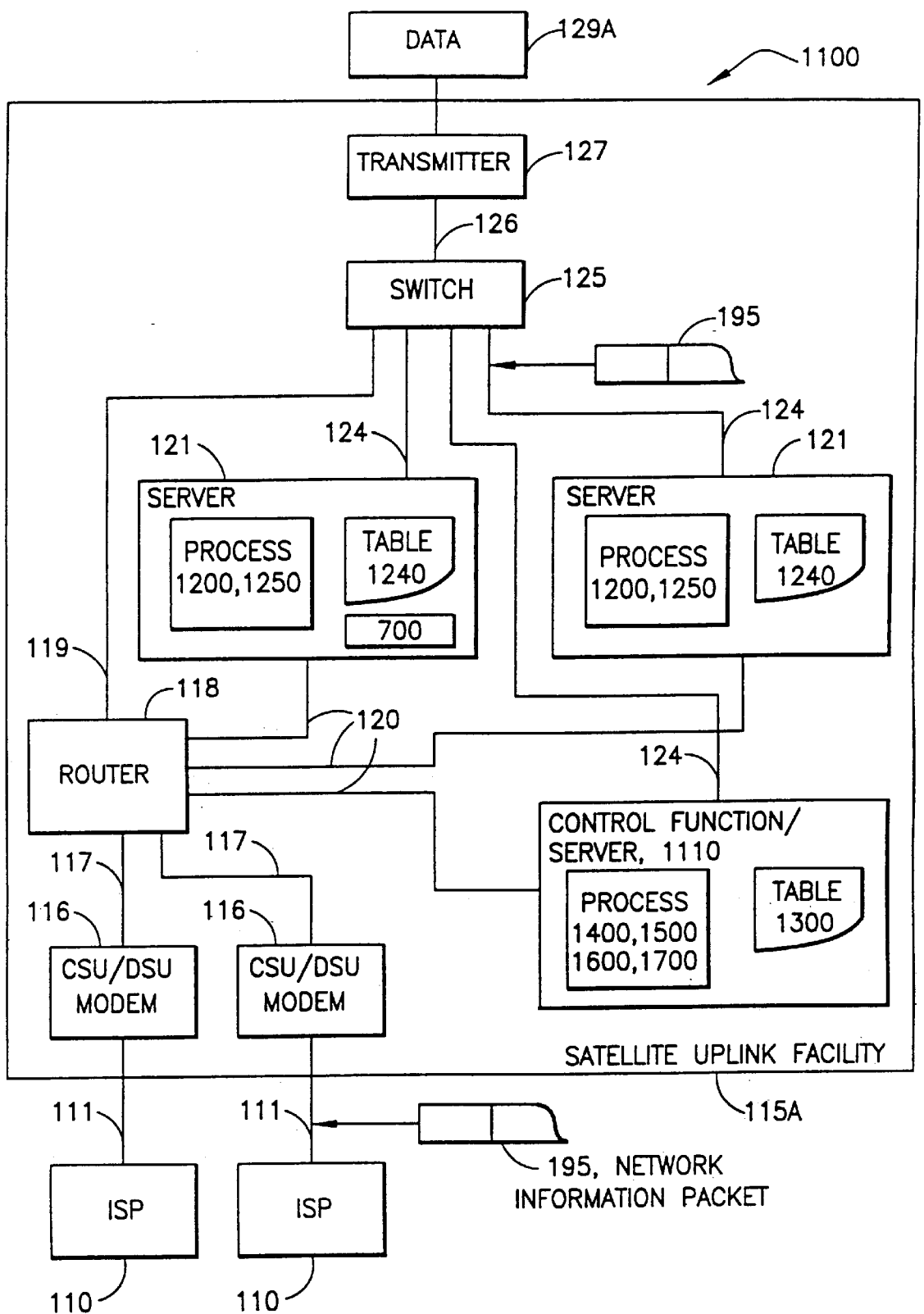
FIG. 11 is a block diagram showing the servers connected to one or more networks, receiving information from a plurality of information providers, packaging the information on selected channels with category information, and providing commands to multiplex the information on one or more channels accessible by the clients.

FIG. 11 is a block diagram showing a novel uplink facility 115A and the servers 121 connected to one or more bidirectional networks 119, 120, 124, receiving information from a plurality of information providers 110, packaging the information on selected channels 430A with category information 432A, and providing commands 415 to multiplex the information on one or more channels accessible by the clients. Blocks in common with those in FIG. 1 are given the same block number and are described above. Block 1110 is a control server which assigns and unassigns channel identifier 430A allocation. The control function/server 1110 communicates with the processes 1200 executing on the server(s) 121 through a network connection e.g. 120, through the router 118. Block 1300 is a data structure which, in this preferred embodiment, is resident in the memory of the control server 1110. This data structure 1300 is a table of information about assigned channel identifiers 430A and is described in FIG. 13, below.

Blocks 1400, 1500, 1600, and 1700 are processes which execute on the control function/server 1110 and are described in detail in FIGS. 14, 15, 16, and 17, respectively, below. Process 1400 listens for requests from the servers 121 for channel assignments. Upon receiving a request, it examines table 1300 and assigns an appropriate channel identifier 430A. Process 1500 listens for requests from the servers 121 to unassign a channel identifier 430A. Process 1600 listens for messages from the servers 121 which tell the control function/server 1110 information (such as activity) about assigned channel identifiers 430A. And process 1700 periodically polls the servers 121 to determine if an assigned channel identifier is in use.

Block 1200 is a process which runs on a server 121. The process receives packets 195 from information providers

110, labels the packets 195 with appropriate channel identifiers 430A, and sends the packets 195 to the transmitter 127 for broadcast over communication connection, e.g. a link to a satellite 130. The process obtains the appropriate channel identifiers 430A through communication with processes 1400, 1500, 1600, and 1700 which execute on the control function/server 1110. Block 1240 is a data structure which, in this preferred embodiment, is resident in the memory of the server 121. This data structure 1240 is a table of information about assigned channel identifiers 430A and is described in FIG. 12C, below.

Note that the server 121 can send a standard TCP/IP message that polls known adapters 300 to obtain some or all of the information contained in the category list 700 for each polled adapter. The information in this list can then be accumulated in table 700 on the server 121 and used for various purposes for example marketing information. In addition subscribers can cause this to happen automatically when they change their category lists as in the user add command set message 415C. Further note that the adapters 300 can be classified into those which will provide this information to the server 121 and those which do not depending on customer preferences when subscribing to the service.

Figure 12A:
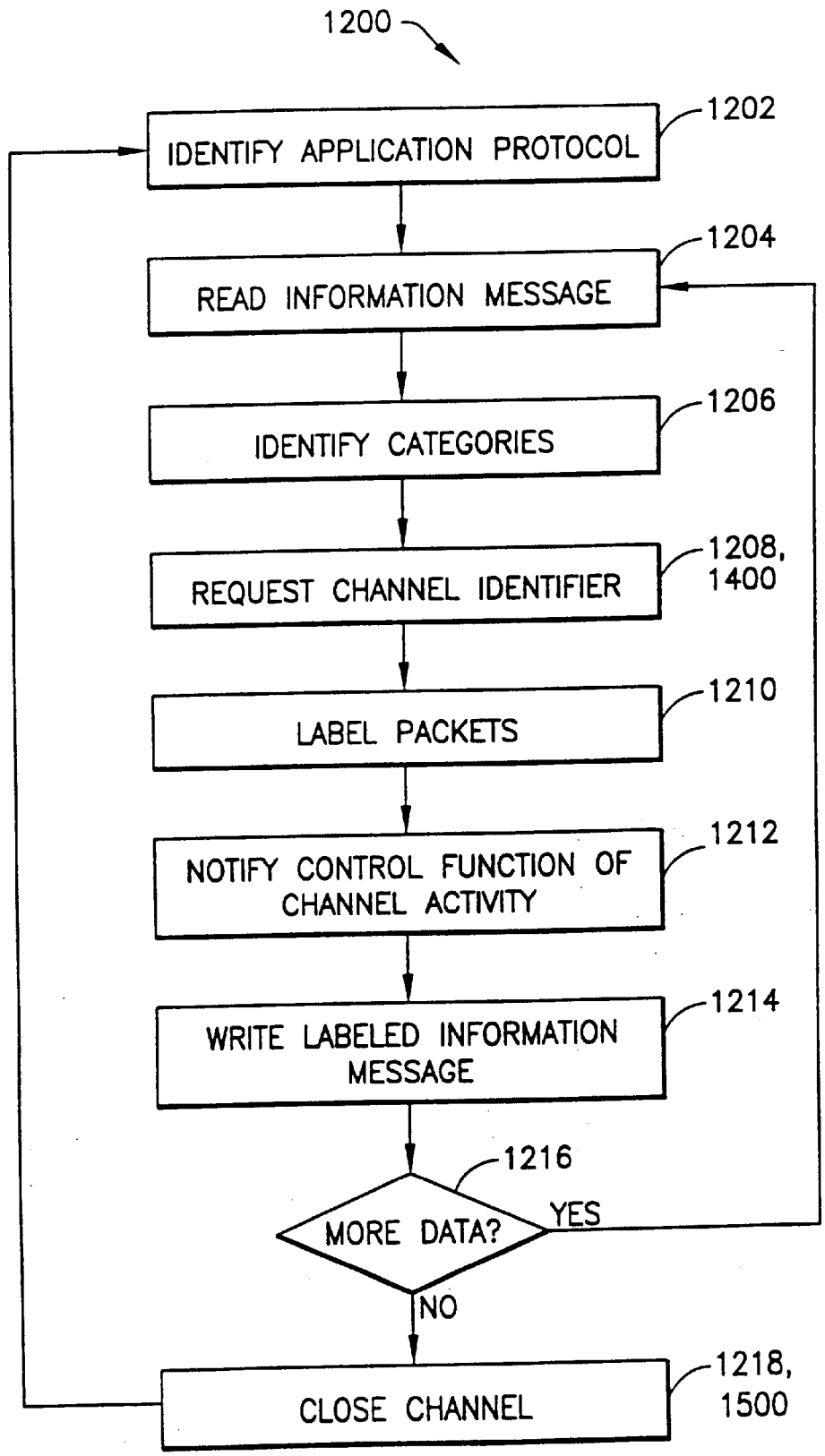
FIG. 12A is a flowchart showing a label process performed by a server to receive, label, and transmit information over a network channel.

FIG. 12A is a flowchart showing a label process 1200 performed by a server 121 to receive, label, and transmit information over a network channel 124. Process 1200 begins by identifying the application protocol 1202 of one or more information messages that it will later label and retransmit. The application protocols can include RealAudio, HTTP, and/or MPEG. These protocols are identified by examining header information on the information messages using known techniques or the protocols could be explicitly identified through a separate method agreed upon between the server 121 and the information provider 110. One such method of identification is through reference of a profile stored in the server's 121 memory. In step 1204, the information message is read depending on the type of application protocol identified in step 1202. For example, if the application protocol is RealAudio, the information message is read as a RTSP (Real Time Streaming Protocol) packet. If the application protocol is HTTP, the information message is read from a TCP/IP socket. If the application protocol is MPEG, the information message is read as a packet of an MPEG data stream. Reading information messages like these are well known.

In step 1206, zero or more categories of information 432A provided in the information message are identified. These categories 432A of information described the content(s) of the information message, e.g. News, Sports, Soccer, language, Audio, Video. Identification of these categories 432A depends on the application protocols of the information messages. For example, if the application protocol is RealAudio, the categories are taken from a profile or message header or some other technique agreed on by the server 121 owner and the information message provider 110. If the application protocol is HTTP, the categories could be read from the predefined header fields within the HTTP message, e.g. the "Keyword:" field. Again, these header fields would be agreed upon by the server 121 owner and the information message provider 110. If the application protocol is MPEG, the categories could be "Audio", "Video", and/or "Data" depending on whether the MPEG information message read described a MPEG Video frame, an MPEG Audio frame, or an MPEG data frame. This information would be in an agreed upon location in the MPEG information message. Note that the content of the information message can be parsed into many different categories, e.g. Audio, Video, News, Soccer, language, etc. depending on the requirements of the server 121 owner/clients, e.g. 170, 180, the agreements on how the categories are transmitted between the content provider and the server owner.

In step 1208, one or more channel identifiers are requested using process 1400 and the request command message 1415 as described below. The server 121 sends the request command message 1415 to the control function/server 1110 which executes the process 1400 to produce a channel identifier 430A which is later used to label the packets 195 broadcast over the network 131. Note that the control function/server 1110 can execute on any of the servers 121 or on a separate control server 1110. Note further that if a channel identifier has already been assigned through process 1400 for the unique set of categories in a previous execution of step 1208, step 1208 will be skipped. A list of assigned channel identifiers 430A is maintained in the open channel table 1240, see FIG. 12C. This table contains zero or more open channel table records 1242 which associate sets of categories 432A (stored in the open channel categories field 1246) with channel identifiers 430A. An additional field, the open channel activity field 1248, is maintained in the open channel record 1242 to keep track of channel activity usage.

To implement step 1208, the server 121 defines how to organize categories 432A into category sets 1246 and then requests a channel identifier 430A for each category set 1246. For example, suppose the information message has an MPEG application protocol and content that includes News, Weather, and Sports. Four category sets might be Audio, News, and Sports; Video, News, and Sports; Weather and Audio; and Weather and Video. Therefore, the server 121 would request four channel identifiers 430A, one for each category set 1246. Accordingly, clients, e.g. 170, 180, subscribing to the server 121 would use the invention described above to select the channel(s) and therefore the category set(s) that they were interested in. For example, a subscriber/client, e.g. 170, 180, can listen to the channel that provides the category set 1246 of audio, news and sports while viewing the channel which provides the category set 1246 of weather and video. While receiving these two channels, the subscriber/client computer 170, 180, does not have to process data broadcast from the server 121 (or any other data on the network) on any of the other channels because the subscriber/client network adapter 300 discards all the unwanted information. By the adapter 300 discarding unwanted information, the client, e.g. 170, 180, has real time access to information he selects without being overloaded by the large amounts of broadcast information on the network, e.g. 163, 142, 157. In addition the server 121 owner and information provider 110 can use the full transmission capabilities of the server 121 to broadcast a wide variety of channelized information without being limited by the clients, e.g. 170, 180, capacity to receive the entire broadcast. Further, the server owner will be able to provide content in packets 195 to a wider variety of clients because the adapter 300 on each client will discard that information (packets) which the client 170, 180 is unable to unwilling to receive. This should increase subscription revenues for the server owner.

In step 1210, the information message will be packetized and each of the packets 195 will be labeled with the channel identifier 430A returned in step 1208. The returned channel identifier 430A uses the label as defined by the network. For example, if the protocol is the ethernet protocol (see FIG. 5A) step 1210 places the returned channel identifier 430A in the ethernet source field 504A for each ethernet packet 195 that is processed by well known protocol stacks to contain the information message (packetized into the payload field 506A) having the content of the category set 1246 now associated with the channel identifier 430A. Further, if the protocol is the ATM protocol (see FIG. 5B) step 1210 places the returned channel identifier 430A in the virtual connection identifier field 504B for each ATM cell 195 that is processed by well known protocol stacks to contain the information message (packetized into the payload field 506B) having the content of the category set 1246 now associated with the channel identifier 430A. Again, if the protocol is the IP protocol (see FIG. 5C) step 1210 places the returned channel identifier 430A in the IP source field 504C for each IP packet 195 that is processed by well known protocol stacks to contain the information message (packetized into the IP payload field 506C) having the content of the category set 1246 now associated with the channel identifier 430A.

Step 1212 notifies the control function/server 1110 that an information message will be broadcast labeled with the channel identifier 430A returned in step 1208. This notification allows the control function/server 1110 to update the channel identifier's 430A channel table record 1310 to indicate that the channel identifier 430A is currently in use and optionally update an activity field 1380 to indicate a level of activity of the channel identifier 430A. The update process 1600 which is executed by the control function/server 1110 is described in detail in FIG. 16 below. In alternative embodiments, steps 1210 and 1212 can be performed in reverse order.

Figure 16A:
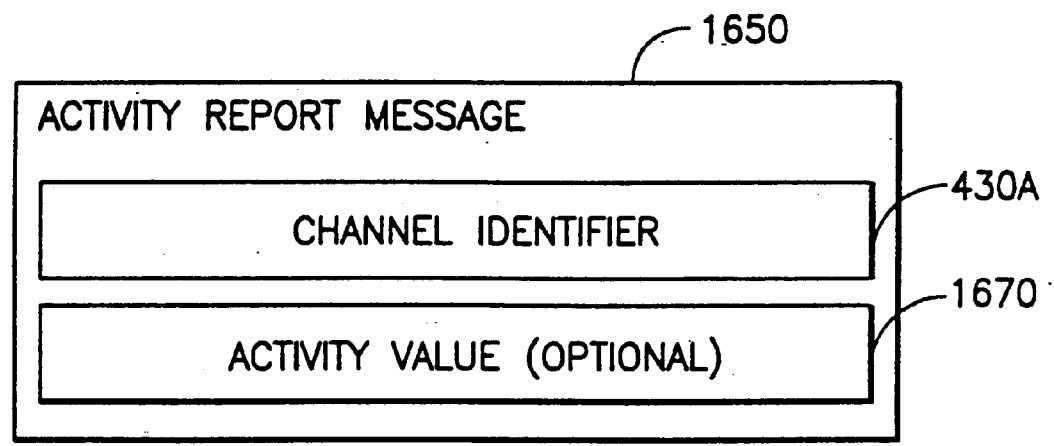
FIG. 16A is a block diagram showing an activity report message.
Figure 17:
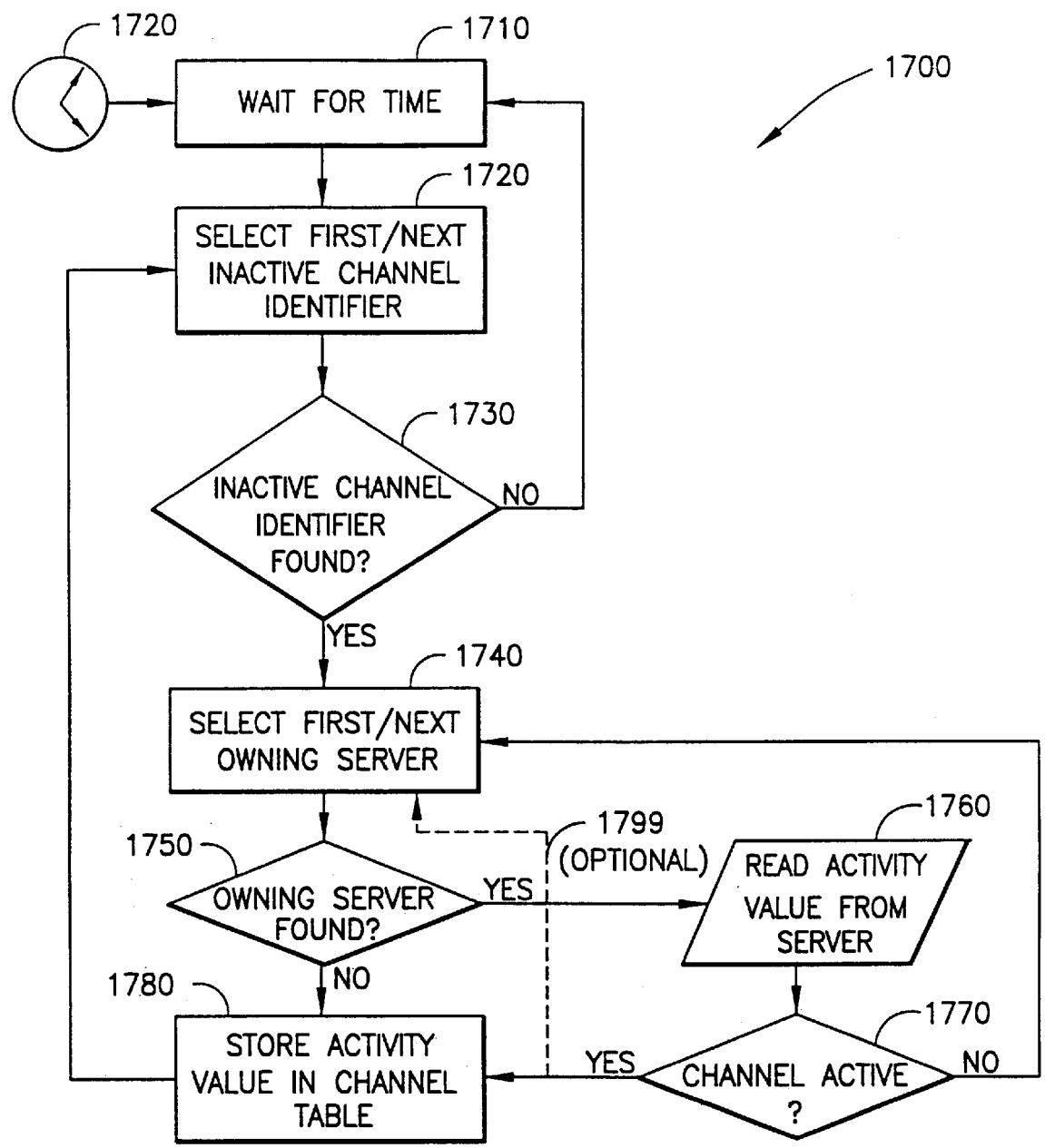
FIG. 17 is a flowchart showing an alternative server control process for updating channel activity fields.

In a preferred embodiment, the notification performed in step 1212 comprises a one-way message, containing the channel identifier 430A, sent from the server 121 to the control function/server 1110. See FIG. 16A below. Other embodiments of the invention include level of channel identifier 430A activity information/value like: the number of bytes within the information message to be written, the number of network packets written for the information message, or a prediction (lower bound) of the time at which a next information message/packet 195 will be broadcast on the network labeled with the channel identifier 430A. Note that by using a one-way message in the preferred embodiment, traffic on the network is reduced compared to that generated by two-way messages. Other embodiments of the invention use two-way messages to exchange additional activity information or to guarantee that the control function/server 1110 has received the notification message. Note further that process 1700, described below in FIG. 17, is a process which executes within the control function/server 1110 which periodically requests activity information from the servers 121. This process 1700 uses two-way communication to account for messages lost during transmission at step 1212.

In a preferred embodiment, a copy of the activity value 1670 sent to the control function/server 1110 is also written into the open channel activity field 1248 associated with the channel identifier 430A. This data is referenced in process 1250, step 1275, described in FIG. 12B below. In the preferred embodiment, the boolean value true is written to the open channel activity field 1248 to indicate the channel identifier 430A is active.

In step 1214, the information message/packets 195 labeled in step 1212 is written onto the network using standard network techniques. Note that part or all of this message can be encrypted using known techniques.

Note that this step may be interrupted by process 1250, if the control function/server 1110 unassigns the channel identifier 430A while labeled data is being written to the network. If process 1250 interrupts step 1214, the process 1200 will resume execution after the interruption at step 1216.

In step 1216, the process 1200 checks to see if there are any more information messages within the application protocol to be read. If so, execution begins again at step 1204 where additional messages are read, labeled, and sent out.

If there are no further information messages to be read, the process 1200 continues at step 1218 where it closes/unassigns the channel identifier 430A. This unassignment is done through a message, containing the channel identifier 430A, sent from the server 121 to the control function/server 1110. Upon receipt of the message, the control function/server 1110 executes process 1500 which updates the appropriate channel table record 1110 in the channel table 1100. Process 1500 is described in FIG. 15 below. Further, step 1218 deletes the open channel record 1242 associated with channel identifier 430A from the open channel table 1240.

After unassigning the channel identifier 430A, the process branches to step 1202 so that a next information protocol and next series of information messages may be served by the server 121.

Figure 12B:
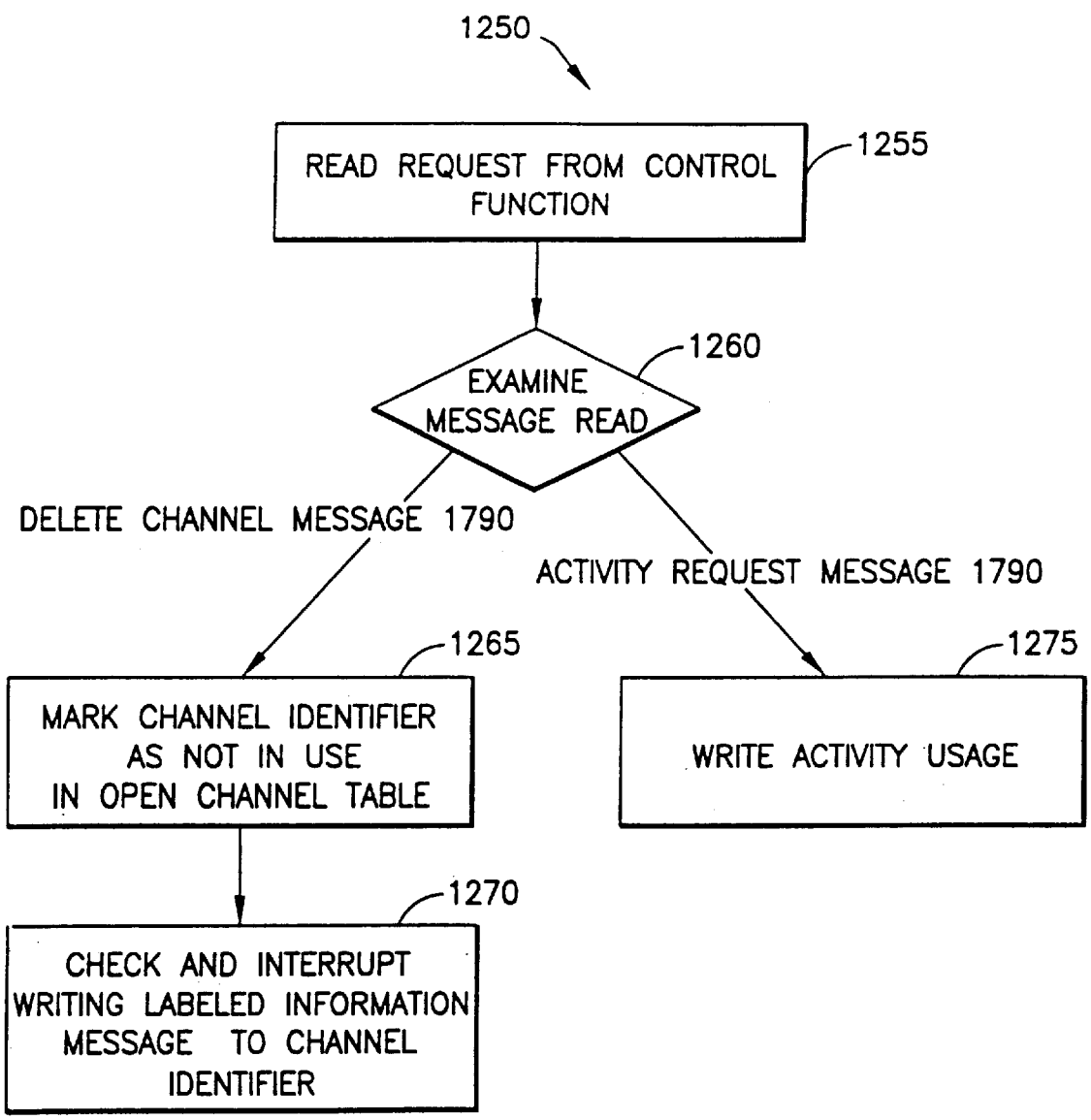
FIG. 12B is a flowchart showing a channel response process performed by a server to respond to requests for channel activity and channel unassignment from the control function/server.
Figure 12C:
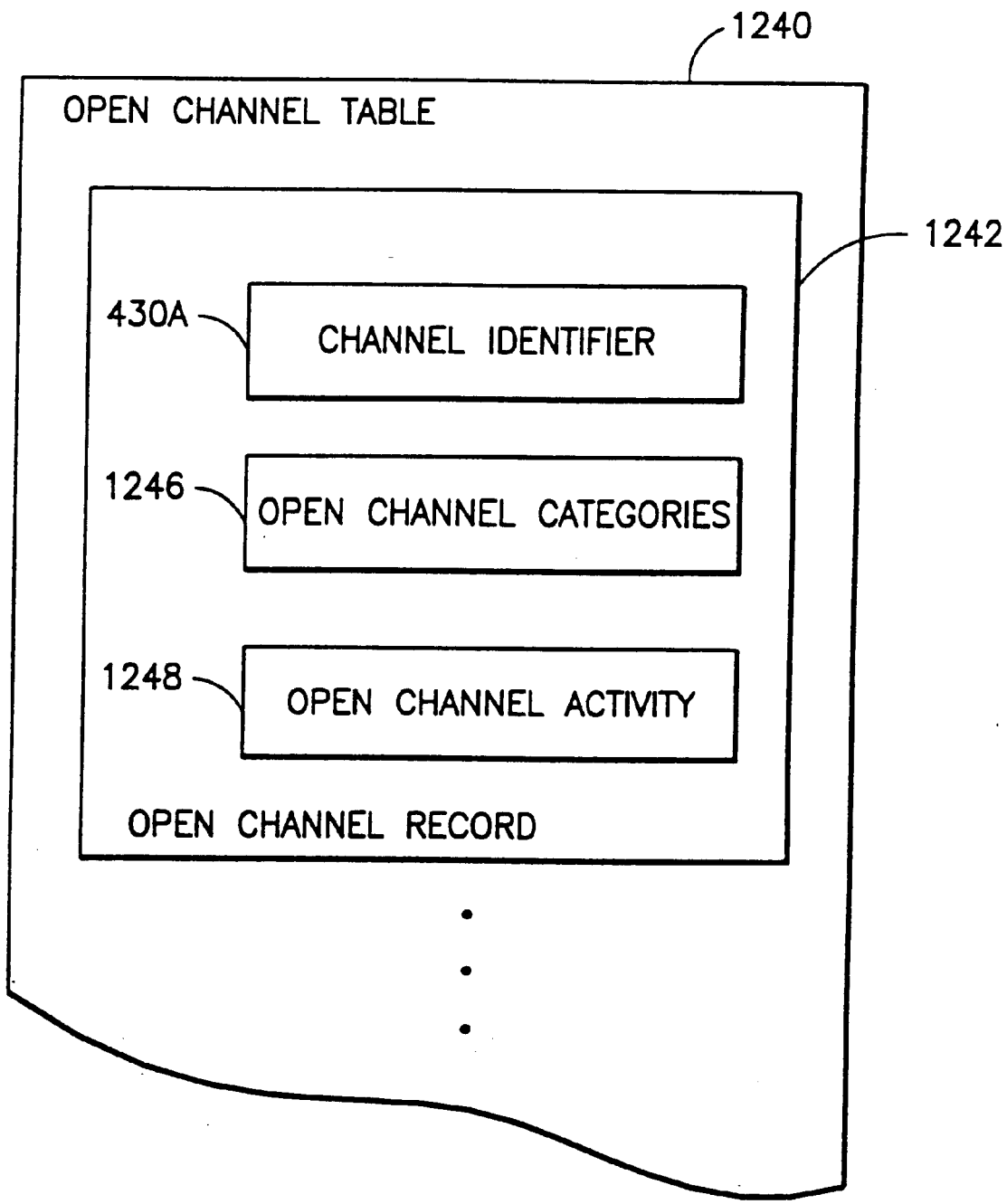
FIG. 12C is a block diagram of an open channel table.

FIG. 12B is a flowchart showing a channel response process 1250 performed by a server 121 when the control function/server 1110 wants to update the activity information/value. Process 1250 begins, step 1255, by waiting for and reading a message from the control function/server 1110. This message can either be a delete channel message 1490 or an activity request message 1790. These messages are described below in FIGS. 14 and 17, respectively, and both contain a channel identifier 430A. Step 1260 determines the type of message read. In the preferred embodiment, the determination is made by examining the port number or other header field within the communication protocol.

If the message is a delete channel message 1490, execution continues 1265 by examining the channel identifier 430A of the delete channel message 1280 and deletes the open channel record 1242 of the open channel table 1240 which contains a matching channel identifier 430A. This step, will cause process 1200 to request assignment of a new channel identifier 430A in step 1208 when a next information message is received by process 1200 which contains the same set of categories 1246 to which the unassigned channel identifier 430A was previously assigned.

The process 1250 then checks 1270 to see if process 1200 is currently writing a labeled information message on the now unassigned channel identifier 430A. If so, step 1214 of the process 1200 is interrupted through an inter-process communication protocol and execution of process 1200 resumes at step 1216. Inter-process communication protocols are well known. The process 1250 then branches back to step 1255.

If the message read during 1255 is an activity request message 1790, execution branches from 1260 to 1275. The process responds to the activity request message by sending an activity report message 1650 back to the control function/server. The activity report message 1650 is described below in FIG. 16A and contains the channel identifier 430A, an identifier 1660 which identifies the server 121, and an activity value 1670. In a preferred embodiment, the activity value 1670 is a boolean value which indicates if a labeled information message has been transmitted over the network with a given channel identifier 430A. The activity field 1248 in the open channel table 1240 is reset to false by 1275 each time an activity report message is received. Hence if no information messages are transmitted labeled with the channel identifier 430A by the server 121 before the next activity request message 1790 is received, 1275 will respond to the next activity report message with a false activity value 1248. After responding to the activity request message 1790, the process branches back to 1255.

Figure 13:
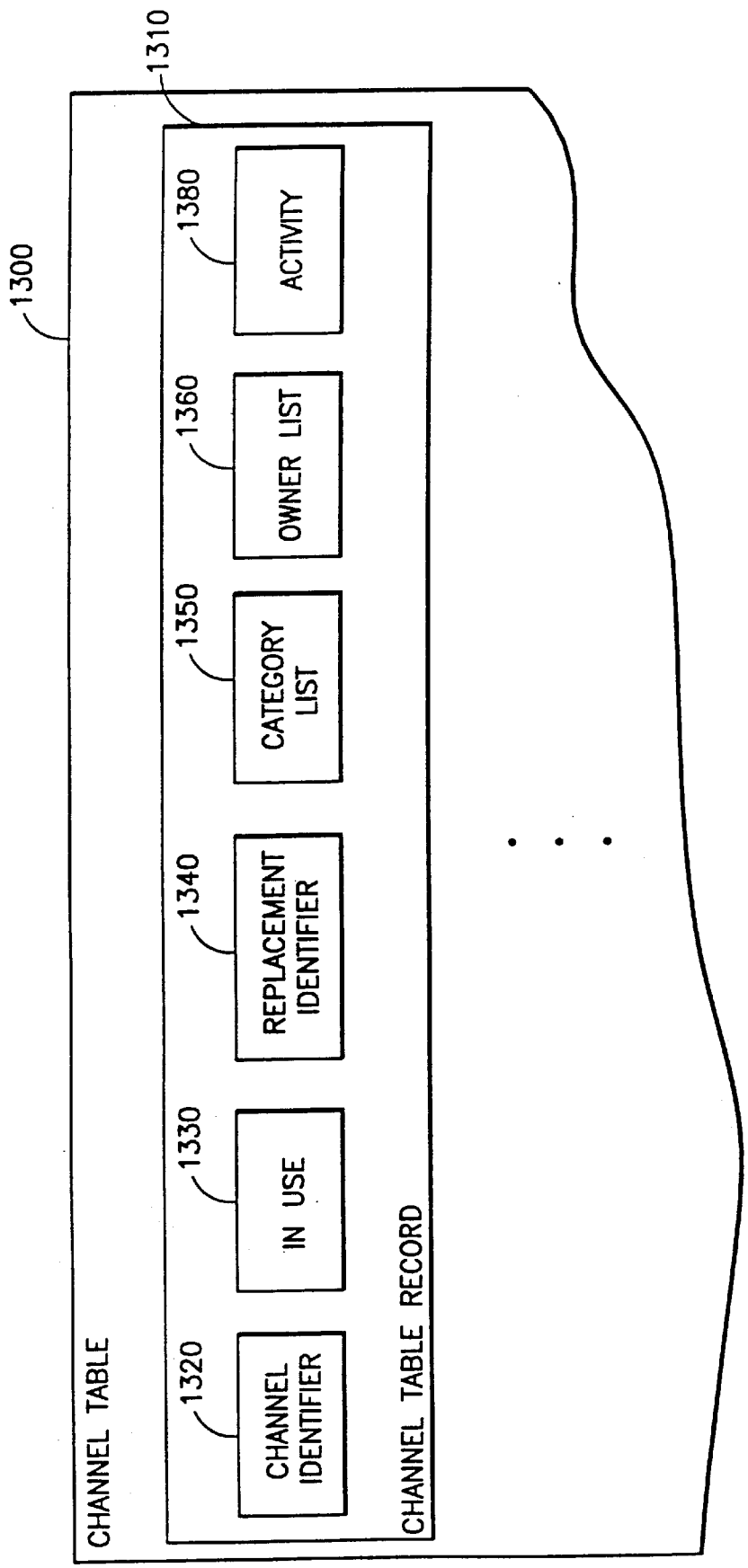
FIG. 13 is a block diagram of a data structure that is used by a controller server to maintain information about channel identifiers.

FIG. 13 is a block diagram of the data structure of a channel table 1300. This table 1300 contains one or more channel table records 1310 which hold information about the assignment and current state of channel identifiers 430A.

The channel identifier field 1320 of the channel table record 1310 contains a channel identifier 430A. Block 1330 is a channel in use field and holds a flag indicating if the channel identifier 1320 has been assigned or is currently unassigned. Block 1340 is a channel replacement identifier which holds a replacement identifier 610/434. This information is acquired by process 1200 in step 1202 and broadcast to the clients in process 1400 when sending an add command, step 1470. The category list field 1350 is a list of one or more categories 432A comprising the category set 1246.

The owner list field 1360 lists the identities of the server(s) 121 which requested assignment of the channel identifier 1320. Block 1380 is an activity field which holds information/values about the current usage of the network channel. In a preferred embodiment, the activity field 1380 holds a timestamp value which indicates the time (in seconds) that the most recent information message was broadcast with the given channel identifier 430A. Other embodiments as described above store activity information such as bytes transmitted or timestamp of next predicted broadcast in the activity field 1380.

Figure 14:
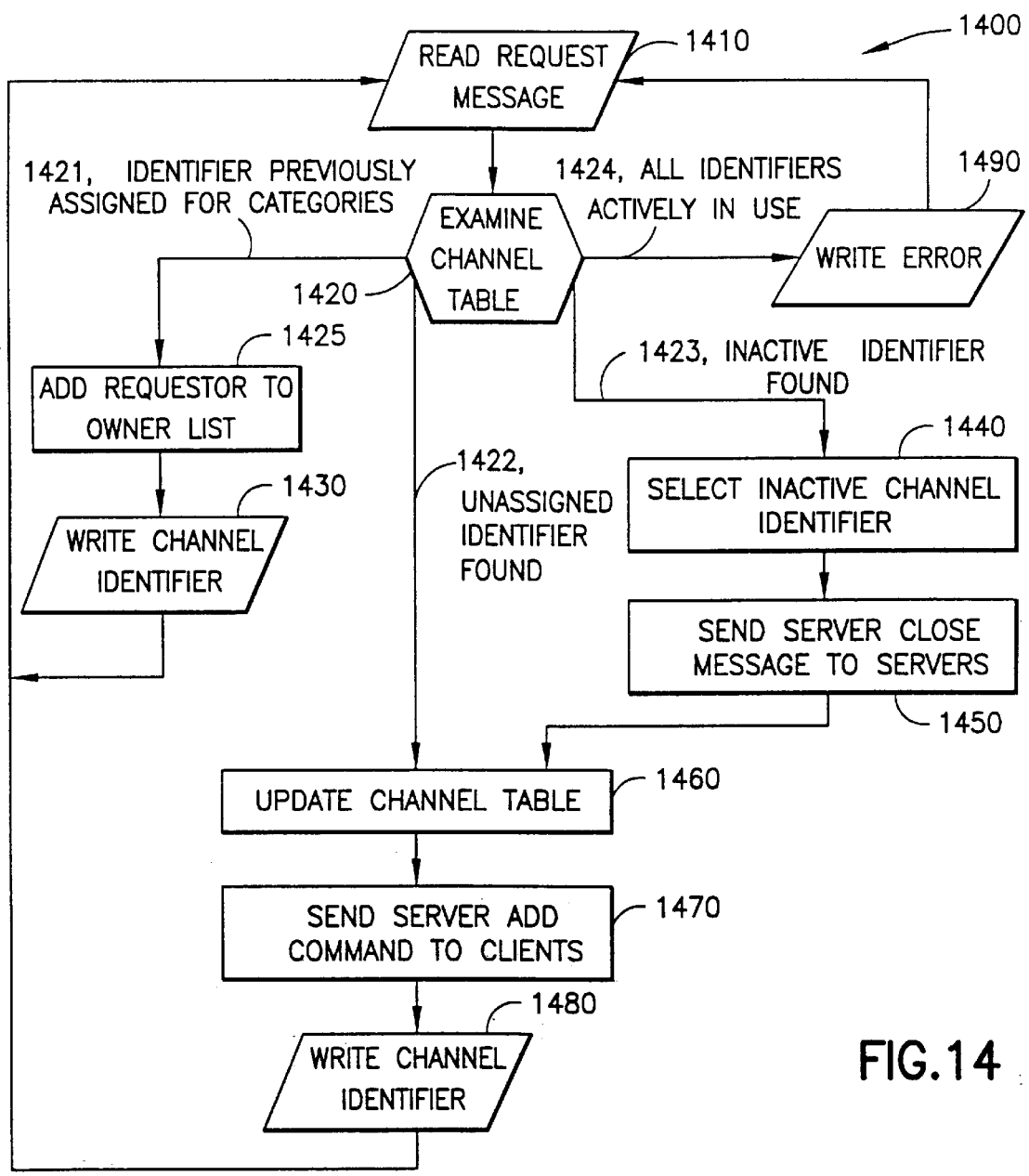
FIG. 14 is a flowchart showing the server control process for requesting channel assignment.
Figure 14A:
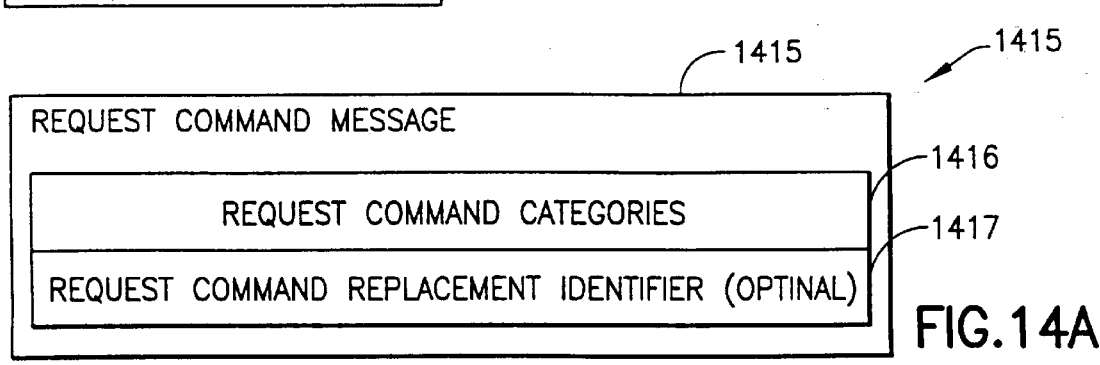
FIG. 14A is a block diagram showing an request command message.

FIG. 14 is a flowchart showing the control function/server process for requesting channel assignment, i.e. associating a channel identifier 430A with one or more respective categories 432A. This process 1400 allows a server 121 to request assignment of a channel identifier 430A for a given set of categories 432A. The process 1400 also notifies connected client network adapters 300 through broadcast messages 415A of the new assignment. Refer also to FIG. 14A showing a block diagram of a request command message 1415. The process 1400 begins 1410 by reading a request command message 1415 from the network connection 120. The request command message 1415 is sent by the server 121 to the control function/server 1110 through an agreed upon process-to-process or server-to-server communication protocol. The request command message 1415 contains the following fields: a request command categories field 1416 which contains zero or more categories 432A; and, optionally, a request command replacement identifier 1417.

The process then 1420 examines the channel table 1300 to determine which, if any, of the following conditions are satisfied: 1) the existence of a channel table record 1310 that contains a true value in the in use field 1330, a matching set of categories in the category list field 1350, and (optionally) a matching replacement identifier 1340; 2) the existence of a channel table record 1310 which has a false value in the in use field 1330; and 3) the existence of a channel table record 1310 which contains an inactive value in the activity field 1380, or (optionally) a value which is below a preset activity threshold.

If the first condition is satisfied 1421 then a channel identifier 430A has previously been assigned for the request command categories 1416 and (optionally) request command identifier 1417. This could happen if a second server 121 previously requested assignment for the same categories 432A and replacement identifier 1417 to label and broadcast a second series of information messages. The identity of the calling server 121 is added 1425 to the owner set field 1360 in the found channel table record 1310. Then in step 1430 the found channel identifier 430A is written back to the calling server 121 through the communication protocol. This process then returns to step 1410 to read a next request message.

If the second condition of 1420 is satisfied 1422 then an unassigned channel identifier exists in the channel table 1300 which can be assigned to the given categories 1416 and replacement identifier 1417. Step 1460 copies the request command categories 1416 and (optionally) the request command replacement identifier 1417 into the categories 1350 and replacement identifier fields 1340 of the matching channel table record 1310. It also initializes the "in use" field 1330 to true, initializes the activity field 1380 to a no activity value, and places the identity of the calling server 121 in the owner list field 1360. The matching channel table record 1310 is thus initialized to show that the channel identifier 430A has been assigned to the categories 1416 and to indicate which server 121 owns the assignment. Note that execution of process 1400 proceeds to 1460 only when the first condition was not satisfied.

The process continues, step 1470, and broadcasts an add channel command to all connected client network adapters 300. An add channel command set message 415A is constructed which contains the add command, the found channel identifier (430A, 1320), the request command set of categories (1416, 1350), and the (optional) replacement identifier (1417, 1340). By broadcasting this add channel command set message 415A, process 1400 notifies all connected client network adapters 300 of the new channel assignment. The adapters 300 will then compare the set of categories 1416 against their category lists 700 and decide if the channel identifier 430A should be added to their preference lists 600 as described above. The process 1400 then writes 1480 the assigned channel identifier 430A to the calling server 121 through the communication protocol. The process then returns to step 1410 to read a next request message.

If the third condition of 1420 was satisfied (and neither the first nor the second conditions were satisfied) 1423 then no channel identifiers have previously been assigned to the category set 1416 and (optional) replacement identifier 1417 however, there is at least one previously assigned channel identifier which currently has no activity (information messages being sent labeled with it). The least active channel identifier 430A in the channel table 1300 is identifier 1440. A message is sent to the owning servers 121 informing them that the channel has been unassigned 1450. In a preferred embodiment of this invention, the least active channel identifier 430A is determined 1440 by selecting the first found channel table record 1310 with an activity field 1380 that contains the smallest timestamp. Other embodiments may determine 1440 the least active channel identifier by encoding more information into the activity field 1380 (such as byte counts sent over the channel, or a timestamp of when the last information message was sent over the channel) and basing the least active channel decision 1440 on the extra information.

In a preferred embodiment, one message is sent 1450 to each owning server 121 over a two way communication protocol. The message contains the channel identifier 430A being unassigned. Alternative embodiments may broadcast 1450 one message containing the channel identifier to all servers 121 with a one way communication protocol. This alternative embodiment uses less network bandwidth but does not account for the case where one server 121 does not receive the broadcast message due to excessive network traffic or processor load.

After the message 1450 has been sent to the server 121, the process continues to step 1460 where the channel table 1300 is updated and the connected clients 300 are notified of the reassignment as described above.

If 1424 none of the conditions checked for in 1420 were met then all channel identifiers 430A are currently assigned and active. The process writes 1490 an error message to the server 121 over the communication protocol and returns to step 1410 to wait for a next channel request message 1415 as shown in FIG. 14A described above. Note that during the time the process 1400 is waiting for a second channel request message 1415 to arrive, some channels may become inactive or unassigned through the processes 1500, 1600, and 1700, described in FIGS. 15, 16, and 17 below, respectively.

Figure 15:
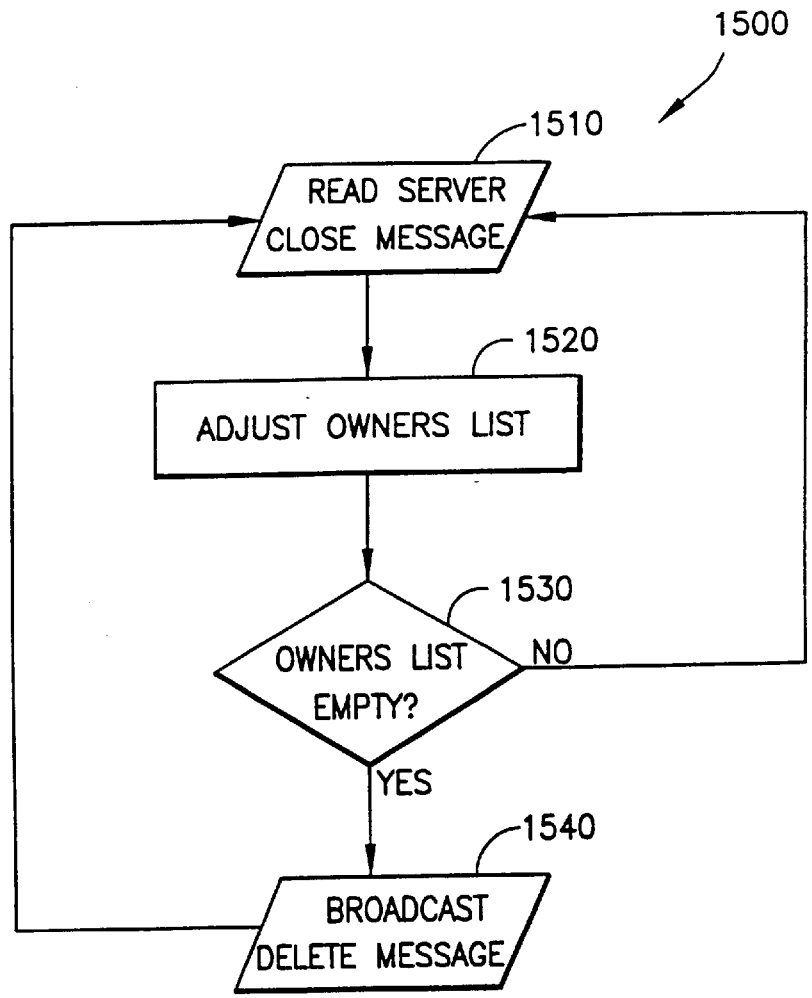
FIG. 15 is a flowchart showing the server control process for requesting channel unassignment.
Figure 15A:
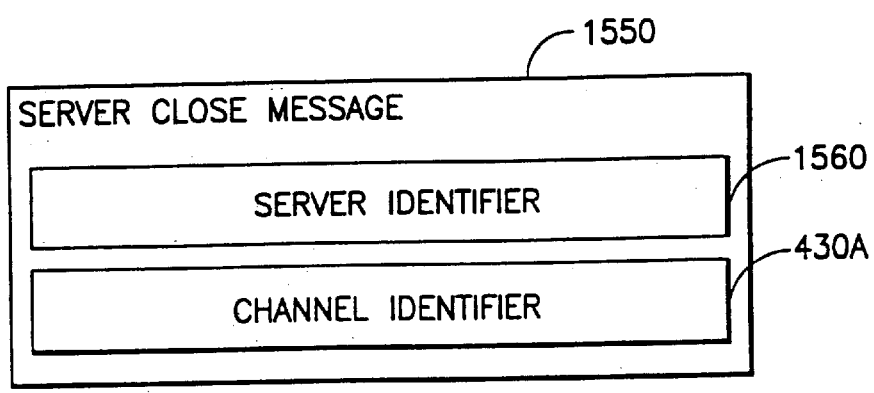
FIG. 15A is a block diagram showing a server close message.

FIG. 15 is a flowchart showing the server control process 1500 for requesting channel unassignment, i.e disassociating a channel identifier 430A from one or more respective categories 432A. Refer also to FIG. 15A which is a block diagram of a server close message 1550. This process allows a server 121 to notify the control function/server 1110 that it has stopped labeling information messages with a given channel identifier 430A. The process 1500 adjusts the channel identifier's channel table record 1310 so that the channel identifier 430A may be reassigned for future use. The process begins 1510 by reading a server close message 1550 from the network 120. Servers 121 send server close messages 1550 to the control function/server while executing process 1200, step 1218.

The server close message 1550 contains a server identifier field 1560 and a channel identifier field 430A. The server identifier 1560 identifies the server 121 which sent the message. The channel identifier 430A identifies the channel which the server 121 has finished using.

After a server close message 1550 has been read from the network 120, the process 1500 adjusts 1520 the owner list field 1360 in the channel table record 1310. The channel table record 1310 is located which contains the channel identifier 430A and the server identifier 1560 is removed from the list of server 121 identifiers within the owner list field 1360. If the owner list field 1360 is not empty 1530, the channel identifier 430A is still in use by another server 121 and the process jumps to step 1510 to read a second server close message 1550.

If the owner list field 1360 is now empty 1530, then no servers 121 are using the channel identifier 430A to label information messages. A delete channel command set 415B is sent to all connected client network adapters 300. A delete channel command set message 415A is constructed which contains the delete command and the channel identifier 430A. This message is broadcast over network 124. By broadcasting this delete channel command set message 415B, process 1500 notifies all connected client network adapters 300 of the channel unassignment. The adapters 300 will then remove the channel identifier 430A from their preference lists 600 and stop receiving data broadcast labeled with that channel identifier as described above. The process then jumps back to step 1510 to wait for and read a next server close message 1550.

Figure 16:
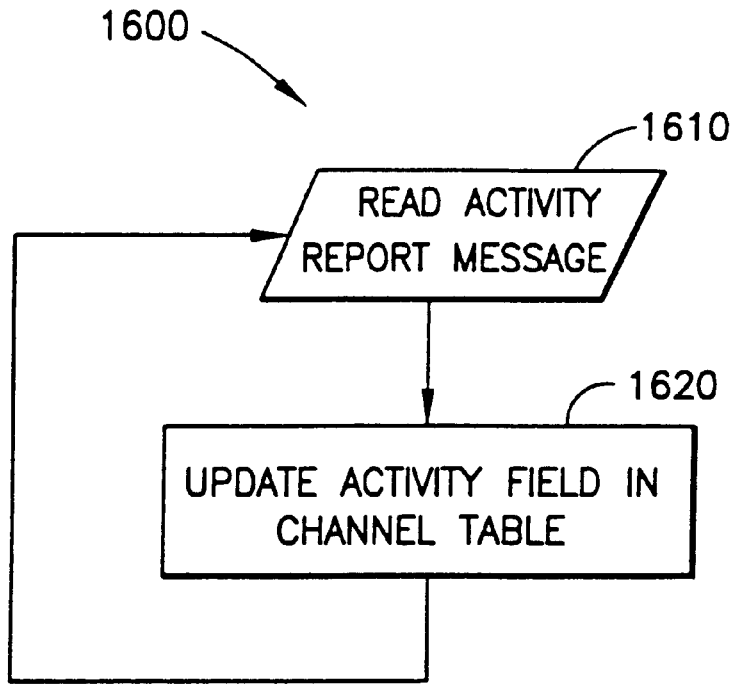
FIG. 16 is a flowchart showing the server control process for updating channel activity fields.

FIG. 16 is a flowchart showing the server control process 1600 for updating channel activity fields 1380. Refer also to FIG. 16A which is a block diagram of an activity report message 1650. The servers 121 send activity report messages 1650 when they broadcast labeled information messages onto the network 124. These activity messages 1650 inform the control function/server 1110 that a channel is in use. The control function/server 1110 uses this information when selecting channel identifiers 430A which need to be unassigned. The process begins 1610 by reading an activity report message 1650 which was sent from a server 121. The activity report message 1650 contains a channel identifier field 430A and an activity value field 1670. In a preferred embodiment, the activity value field 1670 contains a boolean value which indicates if an information message has been labeled with the given channel identifier 430A between the time a prior activity report message 1650 was sent and the time the current message was sent. This field 1670 corresponds to the activity field 1248 which the servers 121 maintain in their open channel tables 1240. In alternative embodiments, the activity value field 1670 indicates the number of bytes in information messages which were broadcast since a prior activity report message 1650 was sent. Factors such as these can be used in any combination. Other embodiments report the rate per time (seconds) of bytes sent in information messages, or a projected interval of time before the next labeled information message will be sent out. Factors such as these can be used in any combination.

After the process 1600 reads an activity report message 1650, it updates the appropriate activity field 1380 in the channel table 1300. The activity field 1380 is selected by locating the channel table record 1310 in the channel table 1300 which contains the matching channel identifier 430A. In a preferred embodiment, the activity field 1380 contains a timestamp indicating the most recent time (in seconds) at which activity and activity report message was received. Step 1620 writes the current time (in seconds) into this field.

Figure 17A:
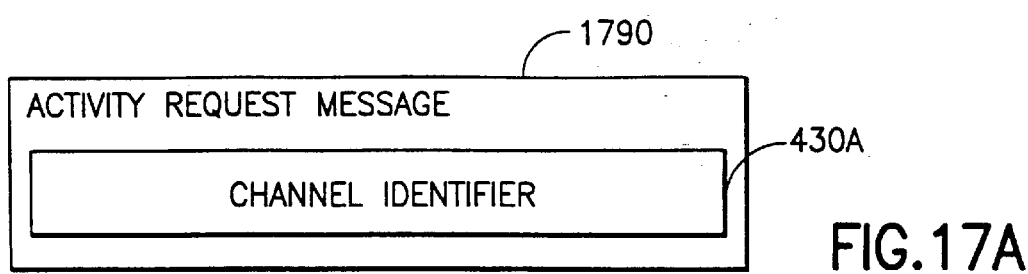
FIG. 17A is a block diagram showing an activity request message.

FIG. 17 is a flowchart showing an alternative server control process 1700 for updating channel activity fields. Refer also to FIG. 17A which is a block diagram of an activity request message 1790. This process 1700 periodically polls servers 121 which have been assigned channel identifiers 430A for labeling information messages to determine if the channel identifier 430A are in active use. The channel table 1300 is updated based upon the values returned. The process begins 1710 by waiting for a period of time 1720. The period at which the process 1700 polls should take into account the amount of contention for the channel identifiers 430A. A system 1100 in which the channel identifiers 430A are rarely all in use at any given time will not need to poll for activity values as often as a system 1100 in which there are few channel identifiers 430A available compared to the number of servers 121 and distinct sets of categories 432A of information messages which are being served. The amount of time the process waits in 1710 will typically be read from a profile and be measured in seconds. Note that this process 1700 and process 1600 perform similar function in that each update the activity fields 1380 in the channel table 1300. However, they differ in that process 1600 receives messages which originated at the servers 121 and were sent to the control function/server 1110 whereas the messages in process 1700 originate at the control function/server 1110 and are sent to and received from the server 121. In a preferred embodiment, the activity report messages 1650 which process 1600 receives are sent as one-way broadcast messages from the servers 121. These messages could be lost due to network traffic and never received by process 1600. Process 1700 takes this into account and periodically polls the servers 121 for which activity report messages 1650 have not recently been received.

Note that other factors such as number of packets on the network or number of requests for channel assignments can be used to initiate the process 1700.

After the specified interval of time has passed 1710, the process selects 1720 the first/next channel identifier 430A in the channel table 1300 which has been marked as inactive or which may have become inactive since a prior iteration of process 1700. In a preferred embodiment, channel identifiers 430A are selected based on the timestamp values in the respective activity fields 1380 of the channel table 1300. Any channel identifier 430A which has a timestamped activity field 1380 value between the current time and the time of the prior iteration of process 1700 is a candidate for selection. When no channel identifiers 430A are selected the process returns 1730 to step 1710 to wait for the next interval of time. Otherwise, the process continues to step 1740.

At 1740, the process selects the first/next server 121 identified in the owner list field 1360 of the selected channel table record 1310. If a server 121 was selected 1750, the process sends, step 1760, an activity request message 1790 which contains the channel identifier 430A to the selected server 121. The server 121 will receive this message through its process 1250 (described in FIG. 12B above) and respond with an activity report message 1650 that contains an activity value 1670. If the activity value 1670 indicates that the channel identifier 430A has been in active use, the process continues, step 1780, and writes a value in the activity field 1380 of the selected channel table record 1310. In a preferred embodiment, the current system time (in seconds) is written into the activity field 1380. The process has found that the channel identifier 430A is in active use and thus returns to step 1720 to select the next possibly inactive channel identifier 430A. If, however, the activity value field 1670 indicates no activity, the process returns to 1740 to query the next owning server 121 to see if that server 121 will report activity on the selected channel identifier 430A.

When all servers 121 identified on the owner list 1360 have been selected and none has reported activity, the process jumps from step 1750 to 1755. A value is written into the activity field 1380 of the selected channel table record 1310 indicating that the channel identifier 430A is currently inactive. In the preferred embodiment, a value of zero seconds is written into the timestamp held in the activity field 1380.

Note that this process 1700 stops polling servers 121 which own a selected channel identifier 430A once any one server 121 reports activity (step 1770). In alternative embodiments, information stored in the activity field 1380 may vary depending on which owning server 121 was polled. Suppose, for example, an embodiment stores a timestamp value indicating the time a next information message will be broadcast labeled with a channel identifier 430A. One server 121 may schedule a broadcast at 5:00 PM and a second server 121 may schedule a broadcast at 4:00 PM. Depending on which server was polled first, the value of 5:00 PM or 4:00 PM will be written into the activity field 1380 of the selected channel table record 1310. For these embodiments, step 1770 may 1799 branch back to step 1740 instead of to 1780 and step 1755 would write a best found activity value (or a non-activity value) into the activity field 1380.

Given this disclosure other embodiments of this invention would become apparent to one skilled in the art. These embodiments are also within the contemplation of the inventors.

We claim:

1. A filter adaptor comprising:
    a network connection to a network, the network having a protocol, a plurality of broadcast type messages being on the network, the broadcast messages having a destination field and a source field;
    a computer connection to a computer;
    a preference list of one or more fixed channels, each fixed channel having a channel identifier; and
    a filter that monitors the source field and discards any message that does not have a source identifier in the source field that matches one of the channel identifiers on the preference list,
    wherein the network sends command messages that changes entries in the preference list based on the content of the fixed channels.

2. A filter adaptor, as in claim 1, where the filter adaptor reads the destination field to determine that the message is a broadcast type message prior to monitoring the source field.

3. A filter adaptor, as in claim 1, where the filter adaptor determines whether an entry in the source field is a channel number prior to determining if the channel number is on the preference list.

4. A filter adaptor, as in claim 1, where the protocol is any one of the following: ethernet, token ring, and ATM.

5. A filter adaptor comprising:
    a network connection to a network, the network connection capable of processing a plurality of messages using a protocol, the messages including one or more broadcast messages and one or more command messages, the broadcast messages having a destination field and a source field, the command messages having a command field, an identifier field, a command source name field, and one or more information categories;
    a computer connection to a computer;
    a preference list dynamically listing one or more channel identifiers;
    a category list listing one or more selected information categories;
    a command process that identifies each of the command messages sent by the network and updates the preference list if one of the information categories is one of the selected categories; and
    a filtering process that monitors the source field of one or more of the broadcast messages and discards any broadcast message that does not have a source identifier in the source field that matches one of the channel identifiers on the preference list.

6. A filter adaptor, as in claim 5, where the command process adds the channel identifier to the preference list if one or more conditions are satisfied.

7. A filter adaptor, as in claim 6, where one of the conditions is any one or more of the following: always use, never use, use in a predetermined time period, use if a logical condition is satisfied, use if more than one predetermined category is included, and use if more than one predetermined category is not included.

8. A filter adaptor, as in claim 5, where one or more of the command messages is identified as a delete command in the command field, the identifier field has a value that designates the channel identifier to be deleted, and the command process deletes one or more of the designated channel identifiers from the preference list.

9. A filter adaptor, as in claim 5, where the adaptor receives a user message having a user command field and one or more user information categories.

10. A filter adaptor, as in claim 9, where the user message is identified as a user add message in the user command field and the command process adds the user information categories to the category list as selected categories.

11. A filter adaptor, as in claim 9, where the user message is identified as a user delete message in the user command field and the command process deletes the selected categories in the category list that match the user information categories.

12. A filter adaptor, as in claim 9, where the user message is identified as a user add channel in the user command field and the command process adds the user information categories to the preference list as channel identifiers.

13. A filter adaptor, as in claim 10, where the user message is identified as a user delete message in the user command field and the command process deletes the channel identifiers in the preference list that match the user information categories.

14. A computer system comprising:
one or more central processing units and one or more memories;
a network connection to a network, the network connection capable of processing a protocol, a plurality of broadcast messages being received from the network through the network connection, the broadcast messages having a destination field and a source field;
a preference list of one or more fixed channels stored in one of the memories, each fixed channel having a channel identifier; and
a filtering process, executed by one or more of the central processing units, that monitors the source field and discards any message that does not have a source identifier in the source field that matches one of the channel identifiers on the preference lists
wherein the network sends command messages that changes entries in the preference list based on the content of the fixed channels.

15. A method for filtering a plurality of broadcast messages to a computer, comprising the steps of:
determining where a source address on a broadcast message is listed on a filter list;
processing the broadcast message if the source address is listed on the filter list;
discarding the broadcast message if the source address is not listed on the filter list; and
determining if a command field of one of the broadcast messages contains a command with zero or more conditions, and
modifying one or more source addresses on the filter list if all of the conditions are satisfied.

16. A method, as in claim 15, where the filter list includes only source addresses within a set of one or more ranges, and source addresses outside all of the ranges are processed.

17. A filter adaptor for filtering out undesired broadcast channels transmitted from a network to a client, comprising:
a network connection for connecting said filter adaptor to a network, said network transmitting a plurality of channels each comprising a category of programming information transmitted on that channel, said network further issuing command data identifying what category is on each of said plurality of channels;
a client connection for connecting said filter adaptor to a client;
a first memory for storing selected categories of programming information;
a processor means for receiving said command data from said network and comparing the category for each of said plurality of channels to said selected categories to determine selected channels; and
a second memory for storing a selected channel list of said selected channels, said processor means only passing said selected channels in said list to said client connection, wherein said command data from said network dynamically updates said selected channel list without client intervention.

18. A filter adaptor as recited in claim 17 wherein said selected categories comprises a list of key words descriptive of program content.

* * * * *